(12) United States Patent
Lev et al.

(10) Patent No.: US 8,595,446 B2
(45) Date of Patent: Nov. 26, 2013

(54) SYSTEM AND METHOD FOR PERFORMING DYNAMIC MIXED MODE READ VALIDATION IN A SOFTWARE TRANSACTIONAL MEMORY

(75) Inventors: Yosef Lev, New York, NY (US); Marek K. Olszewski, Cambridge, MA (US); Mark S. Moir, Windham, NH (US)

(73) Assignee: Oracle America, Inc., Redwood City, CA (US)

( * ) Notice: Subject to any disclaimer, the term of this patent is extended or adjusted under 35 U.S.C. 154(b) by 1036 days.

(21) Appl. No.: 12/626,333

(22) Filed: Nov. 25, 2009

(65) Prior Publication Data

US 2011/0125973 A1    May 26, 2011

(51) Int. Cl.
*G06F 12/00*    (2006.01)
*G06F 13/00*    (2006.01)
*G06F 13/28*    (2006.01)

(52) U.S. Cl.
USPC .......................... 711/147; 711/156; 710/200

(58) Field of Classification Search
USPC ........................................................ 711/147
See application file for complete search history.

(56) References Cited

U.S. PATENT DOCUMENTS

| | | | |
|---|---|---|---|
| 6,009,426 A * | 12/1999 | Jouenne et al. | 1/1 |
| 7,689,788 B2 * | 3/2010 | Moir et al. | 711/154 |
| 7,711,909 B1 | 5/2010 | Lev et al. | |
| 2004/0015642 A1 * | 1/2004 | Moir et al. | 711/1 |
| 2007/0136289 A1 | 6/2007 | Adi-Tabatabai et al. | |
| 2007/0198519 A1 | 8/2007 | Dice et al. | |
| 2007/0282838 A1 * | 12/2007 | Shavit et al. | 707/8 |
| 2007/0288901 A1 * | 12/2007 | Lev et al. | 717/124 |
| 2008/0163220 A1 | 7/2008 | Wang et al. | |
| 2008/0256073 A1 | 10/2008 | Detlefs et al. | |
| 2008/0256074 A1 | 10/2008 | Lev et al. | |
| 2009/0125548 A1 | 5/2009 | Moir et al. | |
| 2009/0172306 A1 * | 7/2009 | Nussbaum et al. | 711/154 |
| 2009/0282405 A1 | 11/2009 | Moir et al. | |
| 2009/0282410 A1 | 11/2009 | Moir et al. | |

OTHER PUBLICATIONS

Dave Dice, Nir Shavit; TLRW: Return of the Read-Write Lock, Transact 2009: The 4th ACM SIGPLAN Workshop on Transactional Computing.

(Continued)

*Primary Examiner* — Christian P Chace
*Assistant Examiner* — Prasith Thammavong
(74) *Attorney, Agent, or Firm* — Robert C. Kowert; Meyertons, Hood, Kivlin, Kowert & Goetzel, P.C.

(57) ABSTRACT

The transactional memory system described herein may apply a mix of read validation techniques to validate read operations (e.g., invisible reads and/or semi-visible reads) in different transactions, or to validate different read operations within a single transaction (including reads of the same location). The system may include mechanisms to dynamically determine that a read validation technique should be replaced by a different technique for reads of particular locations or for all subsequent reads, and/or to dynamically adjust the balance between different read validation techniques to manage costs. Some of the read validation techniques may be supported by hardware transactional memory (HTM). The system may delay acquisition of ownership records for reading, and may acquire two or more ownership records back-to-back (e.g., within a single hardware transaction). The user code of a software transaction may be divided into multiple segments, some of which may be executed within a hardware transaction.

20 Claims, 10 Drawing Sheets

(56) References Cited

OTHER PUBLICATIONS

Yossi Lev, Victor Luchangco, Virendra Marathe, Mark Moir, Dan Nussbaum, Marek Olszewski; Anatomy of a scalable software transactional memory; TRANSACT 2009: The 4th ACM SIGPLAN Workshop on Transactional Computing.

F. Ellen, Y. Lev, V. Luchangco, and M. Moir, "SNZI: Scalable Non-Zero Indicators," PODC 2007.

Lev, Luchangco, Olszewski, "Scalable Reader-Writer Locks" SPAA '09.

Lev and Moir, Fast Read Sharing Mechanism for Software Transactional Memory; Poster, PODC04, ACM SIGACT-SIGOPS Symposium on Principles of Distributed Computing 2004.

* cited by examiner

SYSTEM AND METHOD FOR PERFORMING DYNAMIC MIXED MODE READ VALIDATION IN A SOFTWARE TRANSACTIONAL MEMORY

BACKGROUND OF THE INVENTION

1. Field of the Invention

This invention relates generally to concurrent access to shared objects, and more particularly to a system and method for implementing a transactional memory that includes mechanisms to support dynamic mixed mode read validation.

2. Description of the Related Art

The multi-core revolution currently in progress is making it increasingly important for applications to exploit concurrent execution in order to take advantage of advances in technology. Shared-memory systems allow multiple threads to access and operate on the same memory locations. To maintain consistency, threads must often execute a series of instructions as one atomic block, or critical section. In these cases, care must be taken to ensure that other threads do not observe memory values from a partial execution of such a block. Such assurances are important for practical and productive software development because without them, it can be extremely difficult to manage the interactions of concurrent threads. Traditional constructs, such as mutual exclusion and locks may be used by a thread to ensure correctness by excluding all other threads from concurrent access to a critical section. For example, no thread may enter a critical section without holding the section's lock. While it does, all other threads wishing to execute the critical section must await the lock's release and acquire it before proceeding.

The pitfalls of these constructs are numerous and well known. They include dead-lock, priority inversions, software complexity, and performance limitations. Locking large sections of code and/or code that accesses a lot of data is a heavy-handed approach to concurrency control.

Alternatively, it may be possible to increase parallelism by allowing multiple threads to execute a critical section at one time if the executions do not rely on overlapping memory locations. This may increase performance and mitigate many of the pitfalls normally associated with traditional locking mechanisms. However, such interleaved executions are not guaranteed to be correct.

Transactional memory is a mechanism that can be leveraged to enable concurrent and correct execution of a critical section by multiple threads. Transactional memory allows a thread to execute a block of instructions either completely and atomically or not at all. As typically defined, a transactional memory interface allows a programmer to designate certain sequences of operations as "atomic blocks" and "transactions," which are guaranteed by the transactional memory implementation to either take effect atomically and in their entirety (in which case they are said to succeed), or to be aborted, such that they have no externally visible effect (in which case they are said to fail). Thus, with transactional memory, it may be possible in many cases to complete multiple operations with no possibility of another thread observing partial results, even without holding any locks. The transactional memory paradigm can significantly simplify the design of concurrent programs. In general, transactional memory can be implemented in hardware (HTM), in software (STM), or in any of a variety of hardware-assisted software implementations.

SUMMARY

In some embodiments, the system described herein may include mechanisms to support dynamic mixed mode read validation. In other words, the system described herein may support the application of a mix of read validation techniques to validate read operations in different transactions, or to validate different read operations within a single transaction, including read operations targeting the same memory location at different times during execution of the transaction. For example, in some embodiments, the system may support the use of different techniques for validating invisible read operations and semi-visible read operations within a single transaction.

In some embodiments, the system described herein may include mechanisms to dynamically determine (i.e. during execution of a transaction) whether an initial read validation technique should be replaced with a different technique for one or more read operations within a given transaction or for one or more read operations of a subsequent transaction. In some embodiments, the system described herein may be configured to dynamically adjust the balance between different read validation techniques in order to manage costs (e.g., in terms of latency and/or memory usage). In some embodiments, using mix of different types of read validation techniques may result in acceleration of software transactions, compared to systems that support only a single read validation technique. In some embodiments of the system described herein, one or more of the read validation techniques may be supported by hardware transactional memory (HTM).

In some embodiments, a computer system may be configured to execute program instructions comprising user code to be completed as an atomic transaction. The user code may include one or more memory access operations to a shared memory (i.e. a memory or portion thereof that is accessible to a plurality of concurrently executing transactions). For a given read memory access operation of the atomic transaction (i.e. one implemented as an invisible read operation), the system may be configured to record a snapshot of the location in the shared memory targeted by the given read memory access operation or a snapshot of an ownership record (orec) data structure associated with the targeted location in a data structure representing an invisible reads subset of a read set of the atomic transaction without attempting to acquire read ownership of the targeted location (i.e. to acquire the ownership record for reading), and then to perform the read memory access operation. For example, information representing an invisible reads subset may be stored in a hash table, linear log, or multi-dimensional array (e.g., an array comprising one row per orec and multiple entries per row, each entry corresponding to reads to one or more locations mediated by the associated orec.) In some embodiments, one or more read memory access operations (including the given read memory access operation) may be implemented as invisible reads as a default or initial technique applied to transactional reads in the system. After performing each read memory access operation implemented as an invisible read, the system may be configured to validate the invisible reads subset of the read set by iterating over the data structure representing the invisible reads subset to determine if current values of memory locations or ownership records thereof for which snapshots are included in the data structure representing the invisible reads subset match the snapshots.

In some embodiments, the system may be configured to determine that a different read validation technique should be applied to one or more subsequent read memory access operations (e.g., read operations targeting the same memory location and/or other memory locations). For example, the system may be configured to determine whether the cost of iterating over the invisible read set exceeds a target cost or cost threshold. In some embodiments, if the cost of iterating over the invisible read set exceeds the target cost or cost threshold, the system may be configured to implement subsequent read access operations targeting the same memory location and/or other memory locations as semi-visible reads.

In some embodiments, implementing read access operations as semi-visible reads may include acquiring read ownership of the targeted location(s) and/or their associated ownership records, and then performing the read access operations. In some embodiments, the system may be configured to validate these semi-visible reads using a method that compares a current value of a read-write conflicts counter with a value of the counter that was recorded at a point at which the semi-visible subset of the transaction's read set was known to be valid (e.g., at the beginning of the transaction).

In some embodiments, the system may be configured to determine that the cost of acquiring read ownership of one or more memory locations and/or their associated ownership records exceeds a target cost or cost threshold. For example, the cost of acquiring read ownership may be high if an attempt to acquire read ownership must be retried many times before it succeeds, or if a data structure used in managing read ownership is expensive to construct and/or modify. In some embodiments, if the cost of acquiring read ownership of one or more memory locations exceeds the target cost or cost threshold, the system may be configured to store an indication that acquiring read ownership for those locations was expensive. Subsequently, another transaction (which may be a concurrently executing transaction) may detect this indication and determine that it should not attempt to acquire read ownership for these locations, but should implement read accesses to those locations as invisible reads instead.

In some embodiments, the system may be configured to delay acquisition of one or more ownership records for reading and to acquire two or more ownership records back-to-back (i.e. as consecutive memory access operations) after having performed the read memory access operations. In some embodiments, the two or more read acquisition operations may be performed within a single hardware transaction, e.g., leveraging best effort hardware transactional memory. In some embodiments, the user code of a software transaction may be divided into two or more code segments, and at least one of the two or more segments may be executed within a hardware transaction e.g., leveraging best effort hardware transactional memory.

Figure 1:
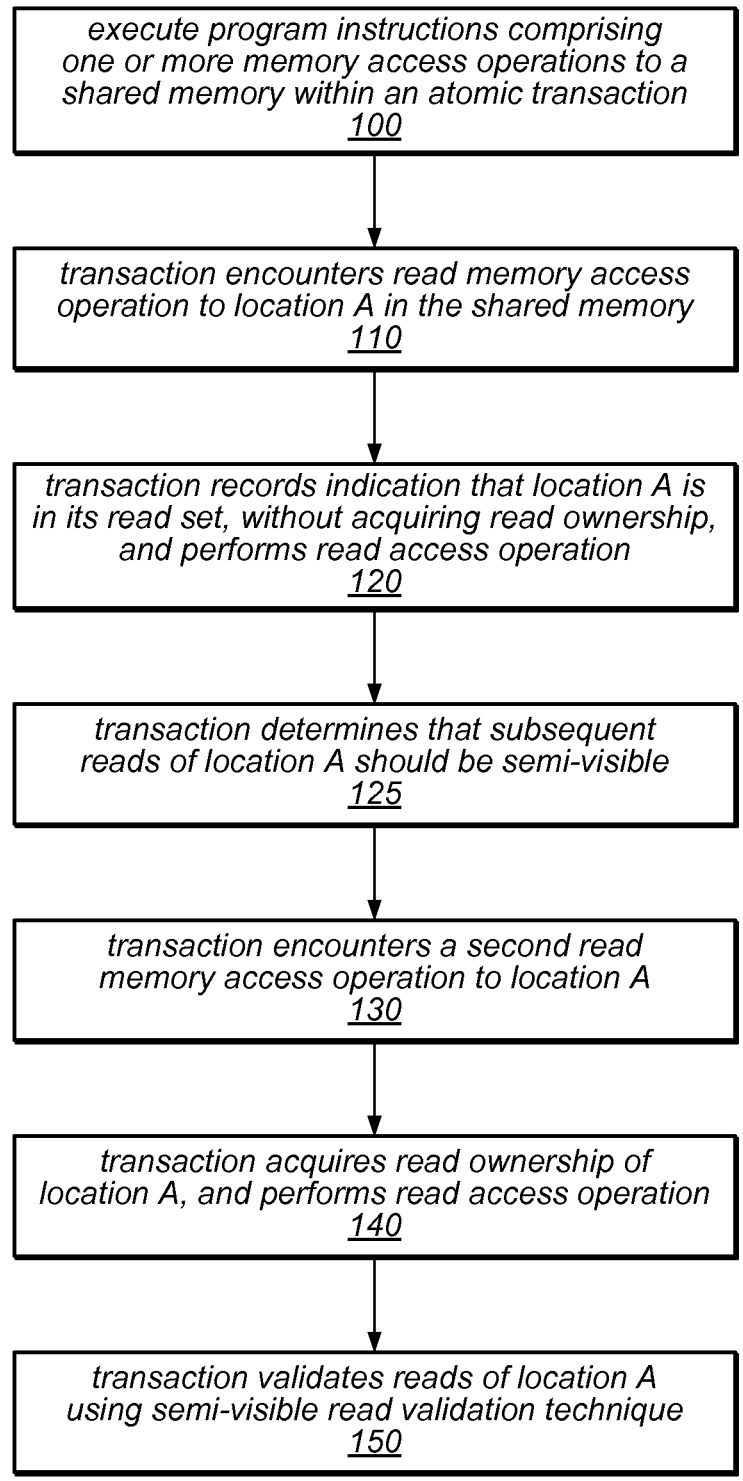
FIG. 1 is a flow diagram illustrating one embodiment of a method for performing dynamic mixed mode read validation in a software transactional memory, as described herein.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

As used herein, the term transaction may refer to a series of program instructions that may be executed together as an atomic operation. As described above, if the transaction succeeds (i.e. is successfully committed), then any resulting changes to shared memory may become visible to entities other than the actor. If a transaction does not succeed (i.e. is aborted), then the transaction attempt will have caused no change to any shared memory location. As described herein, read validation is a process by which software transactions check for consistency of the data with which they are executing, i.e. consistency between data read from a shared memory during execution of a given transaction. In various embodiments, different read validation techniques may be used to ensure that all reads remain consistent with one another while a transaction is executing, therefore preventing the transaction from performing erroneous operations (e.g., operations that cannot be undone) that would otherwise be impossible if executing atomically.

In some embodiments, the system described herein may include mechanisms to support dynamic mixed mode read validation. In other words, the system described herein may support the application of a mix of read validation techniques to validate read operations in different transactions, or to validate different read operations within a single transaction, including read operations targeting the same memory location at different times during execution of the transaction. For example, in some embodiments, the system may support the use of different techniques for validating invisible read operations and semi-visible read operations within a single transaction.

In some embodiments, the system described herein may include mechanisms to dynamically determine (i.e. during execution of a transaction) whether an initial read validation technique should be replaced with a different technique for one or more read operations within a given transaction or for one or more read operations of a subsequent transaction. In some embodiments, using a mix of different types of read validation techniques may result in acceleration of software transactions, compared to systems that support only a single read validation technique. In some embodiments of the system described herein, one or more of the read validation techniques may be supported by hardware transactional memory (HTM).

In some embodiments, the system may support both invisible and semi-visible read validation techniques (which are described in more detail below) in order to leverage the strengths of both approaches. For example, invisible read validation may be fast when used to validate a few locations and it may incur no read ownership management costs, while semi-visible read validation may be readily scaleable, such that it may be applied to large transactions (e.g., those that include many read operations and/or those for which read operations target many different memory locations). In some embodiments, the methods described herein may leverage emerging best effort hardware transactional memory (BE-HTM) support to mitigate the drawbacks of each of these validation techniques. For example, in some such embodiments, the expensive synchronization operations required for ownership management by semi-visible reads may be performed all in one step (or back-to-back) to amortize their costs. In another example, the incremental validation required by invisible reads may be eliminated if the HTM supports a sandbox capability (as is often the case), to discard the effects of potentially erroneous code that might execute following a non-validated read. Note that the system described herein may in some embodiments implement a deferred write approach, recording transactional writes (i.e. memory write accesses included in an atomic transaction) in a private write set until a commit phase, during which they are copied back to shared memory.

As noted above, read validation is a process by which software transactions check for consistency of the data with which they are executing. Traditionally, because validation must be performed after each read, it may represent a significant cost of the overall execution time of a software transaction. Various read ownership methods may be used for validating reads in a software transactional memory (STM), including invisible, visible, or semi-visible read ownership methods.

With an invisible read validation technique, a transaction may maintain per-location metadata (which may be referred to as a snapshot) that can be checked to see whether a memory location that has been read by the transaction has or has not been subsequently written to. When applying an invisible read validation technique, after every read, a transaction may iterate over its entire set of snapshots to determine whether all prior reads are still valid, i.e. that no data read by the transaction has changed since it was read. Since invisible read validation does not require that an executing thread communicate its read locations to other threads, an invisible read validation strategy may be scalable (i.e. it may be scalable for use with any number of threads). However, repeatedly iterating over the transaction's entire read set (i.e. its snapshots) may incur an overhead that is quadratic in time with respect to the number of entries in the read set, precluding the applicability of an invisible read validation technique to workloads running large transactions. Note that while it may be possible to reduce this complexity by various central synchronization mechanisms that sacrifice scalability, such solutions may be even less desirable (i.e. more costly than the techniques they are meant to replace).

With a visible read validation technique, each transaction may indicate to all other transactions that it has read a memory location, allowing other transactions wishing to write to that location to identify and abort such readers. For example, each reader may "register" for each memory location that it reads, and a writing transaction may access this registration information and abort any registered readers. While this approach may dramatically reduce (or virtually eliminate) the cost of validation, the communication required for transactions to announce what memory they have read may be expensive. In addition, this technique may not scale well, especially in the presence of read sharing, where multiple transactions concurrently read the same location.

With a semi-visible read validation technique, a transaction that wishes to write to a memory location may be able to determine whether any other transaction is reading the location, but not which transaction(s) are reading the location. By applying a semi-visible read validation technique, the system may be configured to determine when writers conflict with readers, and to avoid expensive read set validation as long as no writer-reader conflicts have occurred.

Note that if there is contention between transactions, such as if one transaction attempts to read or write to a memory location that is owned for writing by another transaction, the system may be configured to abort the current transaction (i.e. the transaction attempting to perform a read or write access operation), the current transaction may abort the transaction that owns the memory area for writing, and/or the current transaction may steal ownership of the memory area, e.g., according to a contention management policy or at the direction of a contention manager, in various embodiments.

In various embodiments, a transaction may be said to own a location either for reading or for writing. In some embodiments, write ownership may be exclusive to one transaction at a time, while read ownership may be shared between multiple transactions. In some embodiments, a data structure (i.e. an ownership record) may be associated with one or more locations in a shared memory, and may include an indication of whether the one or more locations are owned for reading and/or writing, along with other information used to manage concurrent read and/or write accesses to those locations. Various examples of such data structures (and their uses in read validation) are described herein, according to different embodiments.

In some embodiments, to reduce overhead typically associated with read set validation, when employing semi-visible reads the system described herein may increment a global read-write conflict counter when a writing transaction that conflicts with a reader commits. In such embodiments, there may be no need for a transaction to perform a full validation of its read set if the read-write conflict counter value has not changed since the last time the read set was known to be valid (e.g., at the beginning of the transaction). Using a compare-and-swap type operation (e.g., CAS or a similar atomic operation) to increment a global read-write conflict counter may in some embodiments allow the writing transaction to simultaneously increment the counter and confirm that the counter has not changed, and thus to effect read validation. In the case that the counter has changed, the writing transaction may perform a full read set validation in addition to incrementing the global read-write conflict counter.

As noted above, with a semi-visible read validation technique, a transaction that wishes to write to a memory location may be able to determine whether any other transaction is reading the location, but not which transaction(s). In some embodiments, this may be accomplished by having reading transactions update metadata associated with each memory location on every read, e.g., a counter, or a scalable data construct such as a scalable non-zero indicator (SNZI), which indicates only whether a corresponding count value is zero or non-zero and not any specific non-zero values. Updating such metadata may be referred to as acquiring or releasing an ownership record (or orec) for reading. In such embodiments, writing transactions may check this metadata to determine whether they conflict with readers, and may maintain a counter that is incremented whenever such a conflict occurs. With care, a transaction may avoid the expensive full-read-set validation in the vast majority of cases by checking the counter to see whether any writer-reader conflicts have occurred during its execution. In various embodiments, the counter is updated only when there are writer-reader conflicts, and thus does not impede scalability when no conflicts occur. However, this approach may incur a significant overhead (in terms of latency) due to the cost of the synchronization operations required to acquire and release read ownership of the orecs associated with each location read. For example, in some embodiments, at least two synchronization operations (e.g. CAS type operations) may be performed per orec acquired for reading, and more synchronization operations may be performed if the metadata becomes contended (e.g., due to read sharing) or if implicit privatization is supported. With implicit privatization, a thread may use a transaction to "isolate" a shared chunk of memory so that no other thread should be able to access it (e.g., by setting all shared references to that memory chunk to NULL), and thereafter (non-transactionally) operate on that memory as though it were private.

The system and methods described herein may in some embodiments be used to apply different read validation techniques to various subsets of read operations within one or more transactions executing in the system. For example, invisible read validation may be expensive if there is a large read set that has to be revalidated after each read. However, if a transaction has a small read set and/or a read set that is associated with a small number of ownership records (e.g., three), it may be easier (and/or cheaper) to incrementally validate the read set after each read (validating one location, then two, then three) than to acquire and release ownership of the ownership records using a semi-visible read validation technique (e.g., based on number of operations required for synchronization of this number of orecs).

In some embodiments, the methods described herein may include dividing a transaction's read set into two subsets. Reads of locations in one of the subsets may be validated using an invisible read validation technique, iterating over all of the associated orecs to make sure snapshots have not changed. Reads of locations in the other subset may be validated using a semi-visible read validation technique, which may include acquiring read ownership and validating reads using a read-write conflict counter, as described above.

In some embodiments, the system described herein may be configured to dynamically adjust the balance between these two read validation techniques, in order to manage costs (e.g., in terms of latency). For example, in one embodiment, an invisible read validation technique may be applied as an initial or default technique. In some such embodiments, if the read set gets too big (e.g., if it exceeds a pre-determined threshold size, which may in turn cause the cost of validation to exceed a target cost) and/or if validation takes too long (i.e. the cost of validation in terms of latency gets too high), the system may be configured to start acquiring ownership for any subsequent read operations (treating them as semi-visible reads) and/or to acquire read ownership for some locations that were initially included in the invisible read subset, so that they do not need to be incrementally re-validated in the future. In various embodiments, the system may be configured to dynamically determine which of a plurality of read validation techniques to apply to a given read operation (and/or if and when to change read validation techniques for validating read operations within a particular transaction or for validating read operations targeting a particular memory location) based on different criteria, including, but not limited to, the size of a transaction's read set (which may result in the cost of iterating over the read set exceeding a target cost) and/or the cost of acquiring read ownership for a particular memory location (e.g., in terms of latency). In some embodiments, the methods described herein may be used to delay acquisition of one or more orecs for reading, and to perform read ownership acquisition operations on two or more orecs back-to-back (i.e. using consecutive memory access operations). Note that in some embodiments, other types of operations (e.g., arithmetic operations, or any other operations other than memory access operations) may be executed between the consecutive memory access operations used to acquire read ownership of multiple orecs.

In various embodiments, the use of a mixture of invisible and semi-visible read validation techniques may result in the postponement or elimination of some of the read-acquisition overhead associated with systems that use only one read validation technique (i.e. semi-visible reads). In such embodiments, a transaction's read set may include an invisible reads subset, which may include an identifier or snapshot of any orecs associated with locations in the read set that the transaction has not acquired for read ownership. When the transaction reads a location, it may in some embodiments choose to avoid the acquisition of the corresponding orec for read ownership, and may instead add the snapshot of the orec to the invisible reads subset of the transaction's read set. In some embodiments, at any point during the execution of the transaction, the system may choose to reduce the read validation cost for that transaction by acquiring ownership of some of the orecs that are in the invisible reads subset of the read set.

When the transaction needs to validate its reads, it may do so through a combination of semi-visible and invisible read validation techniques, as follows:

Validate the orecs that were acquired for reading using a read-write conflicts counter based technique, as described above.

Validate the orecs that were not acquired for reading by comparing their values to their snapshots in the read set.

One embodiment of a method for dynamically using different read validation techniques is illustrated in FIG. 1. In this example, different techniques may be used to validate reads for the same memory location at different times within the same transaction. As illustrated in 100 of FIG. 1, the method may include executing program instructions comprising one or more memory access operations (i.e. read and/or write access operations) to one or more locations in a shared memory within an atomic transaction. In this example, the executing transaction encounters a read memory access targeting a location A in the shared memory, as in 110. In this example, read accesses to location A are (at this point) performed as invisible reads. Therefore, as described above, the transaction records an indication that location A is in its read set, but does not acquire read ownership of location A. For example, the transaction may add a snapshot of the orec associated with location A to the invisible reads subset of the transaction's read set and perform the read access operation targeting location A, as in 120. Until or unless read ownership is subsequently acquired, validating the read set of the atomic transaction (e.g., following each read access operation of the transaction), may include comparing this recorded snapshot to a current snapshot of the orec.

Figure 3A:
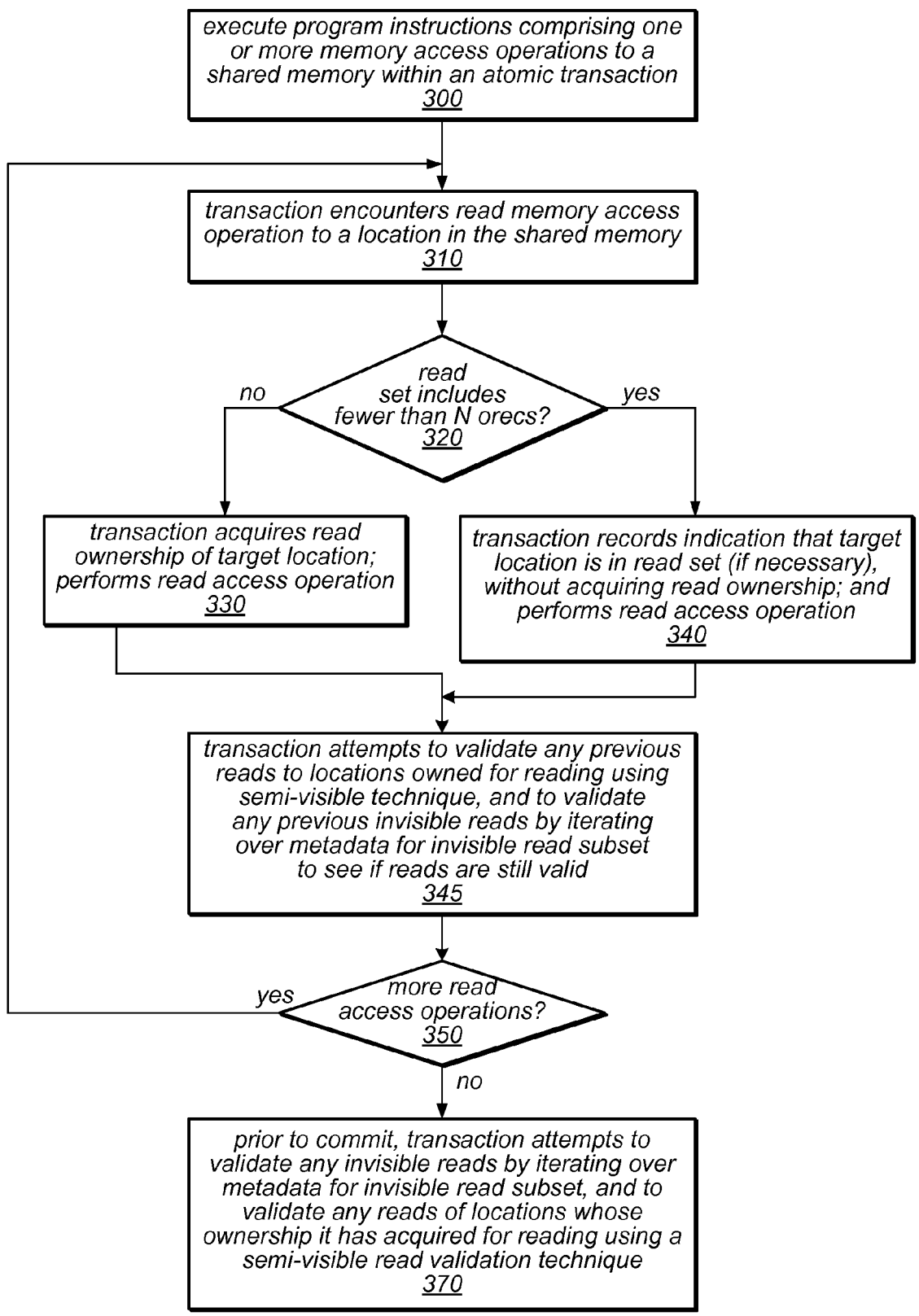
FIG. 3A is a flow diagram illustrating one embodiment of a method for dynamically changing the validation technique used to validate read operations of a single transaction, as described herein.
Figure 3B:
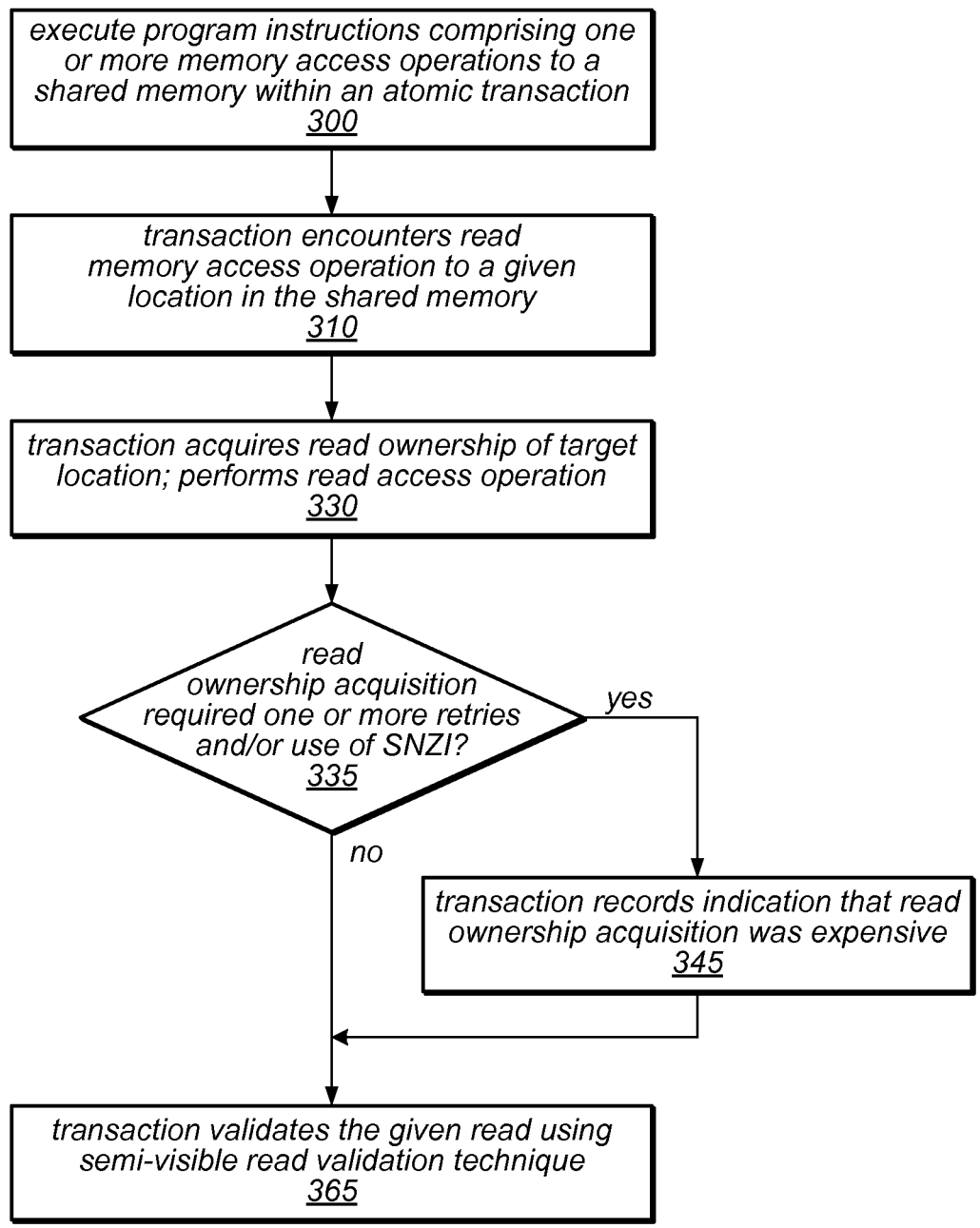
FIG. 3B is a flow diagram illustrating one embodiment of a method for recording an indication that acquiring read ownership of one or more target locations is expensive, as described herein.
Figure 3C:
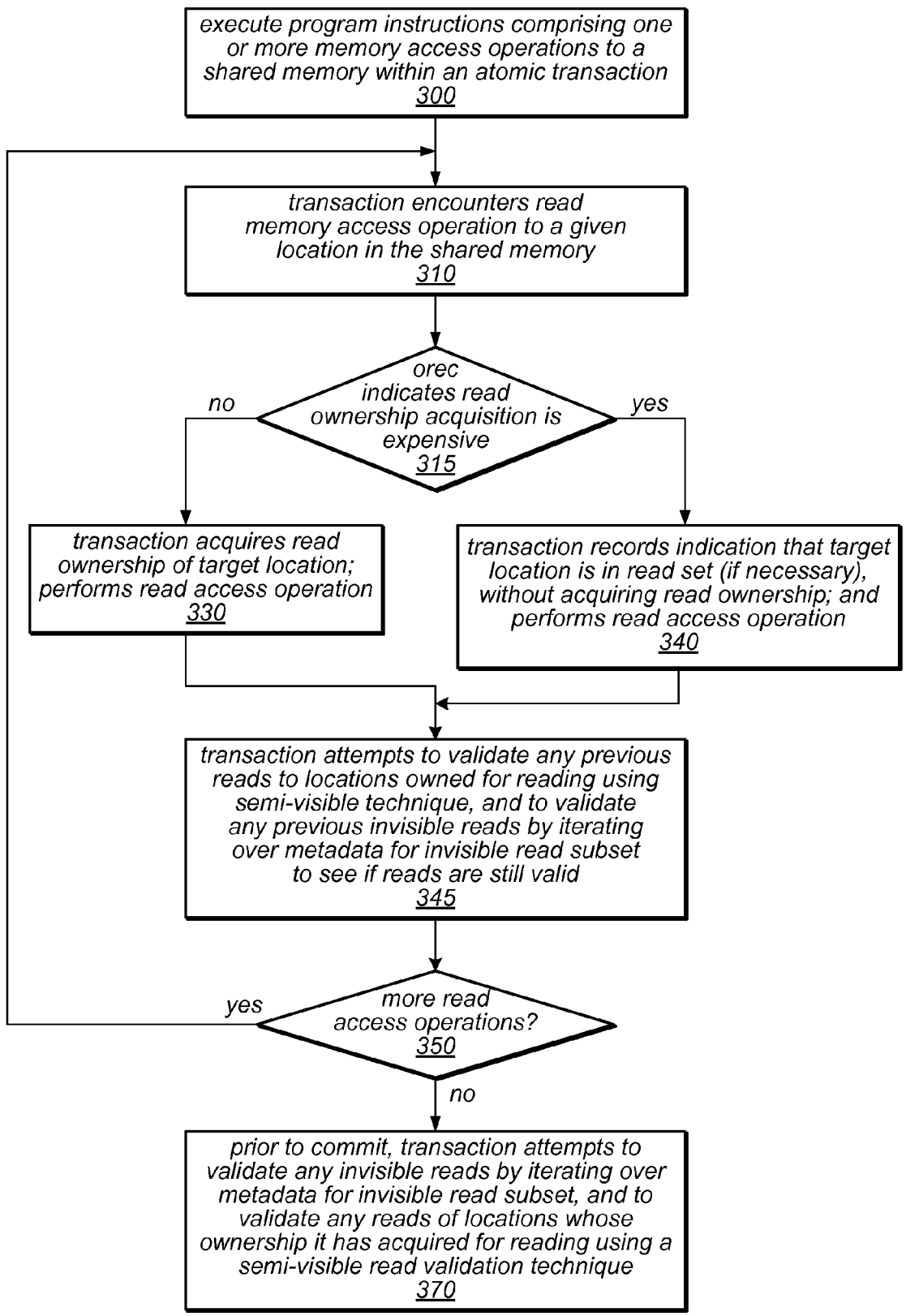
FIG. 3C is a flow diagram illustrating one embodiment of a method for dynamically changing the technique used to validate one or more read operations of a single transaction, dependent on an indication that acquiring read ownership of the corresponding target locations has been (and/or is likely to be) expensive, as described herein.

At some point during the execution of the atomic transaction, the method may include determining that subsequent read accesses targeting location A should be performed as semi-visible reads, as in 125. Various methods for determining whether read accesses should be performed using invisible or semi-visible reads and/or for determining whether to change the technique used to validate reads to a given location or set of locations are illustrated in FIGS. 3A-3C, and described in more detail below. As illustrated in this example, the method may include the transaction encountering a second read memory access operation targeting location A, as in 130. In this case, the transaction may acquire read ownership of location A (e.g., using one of the methods described herein, or any other suitable method), and perform the read access operation, as in 140. In some embodiments, acquiring read ownership of location A may include comparing a previously recorded snapshot of the orec associated with location A to a current snapshot of that orec to ensure that the value read from location A was still valid at the point that read ownership was acquired.

As illustrated in 150 of FIG. 1, the method may include the transaction validating reads of location A using a semi-visible read validation technique. For example, the method may include comparing the current value of a read-write conflicts counter with a value captured at a point when the read set was known to be valid (e.g., at the beginning of the transaction).

Figure 2:
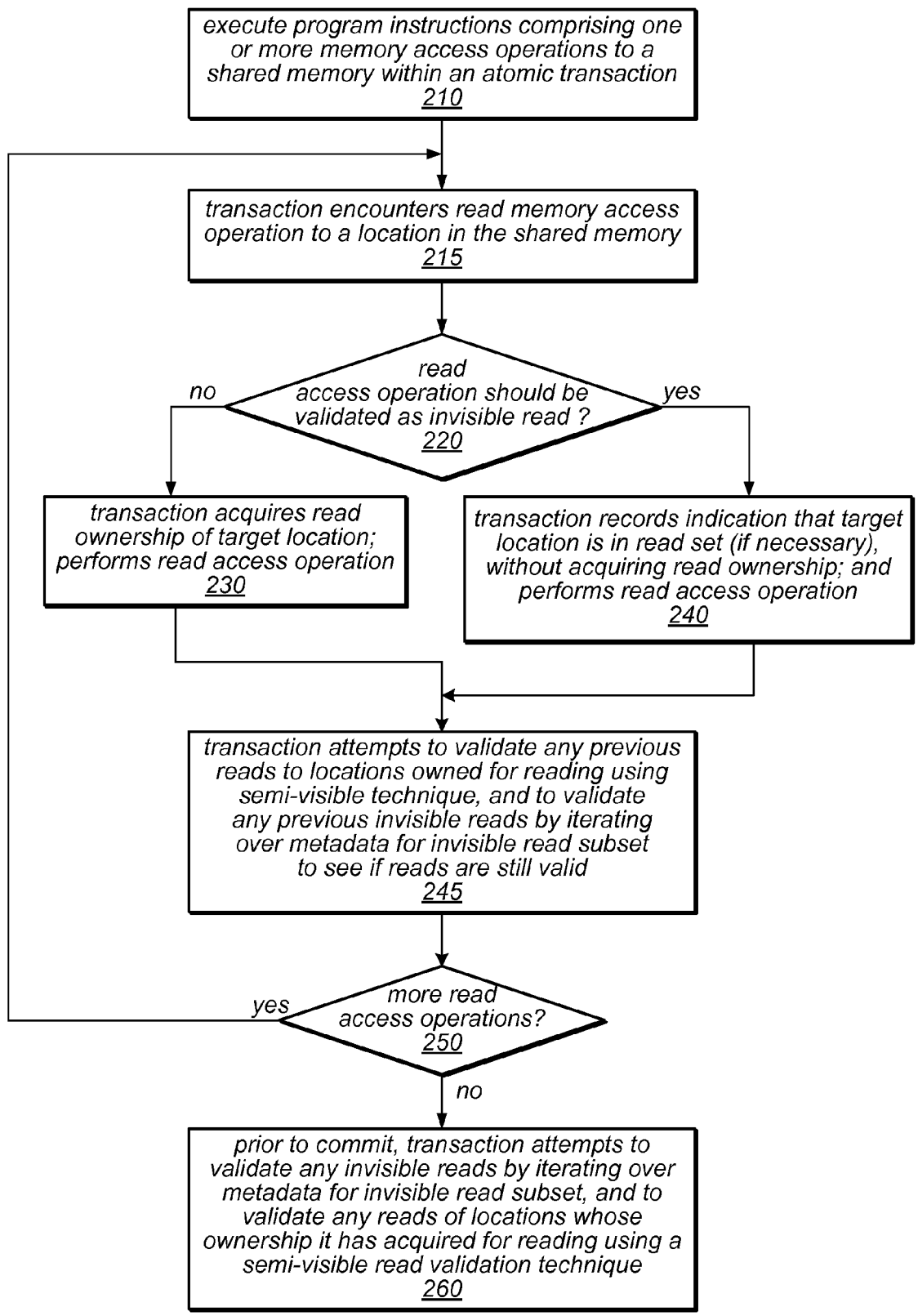
FIG. 2 is a flow diagram illustrating one embodiment of a method for using two different techniques to validate read operations of a single transaction, as described herein.

Another embodiment of a method for dynamically using different read validation techniques is illustrated in FIG. 2. In this example, different techniques may be used to validate reads targeted to different memory locations by the same transaction. In this example, for one or more read access operations (which may comprise a subset of all read access operations within the atomic transaction), the transaction may record an indication that the targeted location is in its read set, but may not acquire read ownership of that location. In other words, for each of these read access operations, the transaction may perform the read access operation as an invisible read. For one or more other read access operations, the transaction may acquire read ownership (e.g., using one of the methods described herein, or another suitable method), and may perform the read access operation. In other words, for each of these other read access operations (which may comprise a different subset of the read access operations within the atomic transaction than those performed as invisible reads), the transaction may perform the read access operation as a semi-visible read.

As illustrated in 210 of FIG. 2, the method may include executing program instructions comprising one or more memory access operations (i.e. read and/or write access operations) to one or more locations in a shared memory within an atomic transaction. In this example, the executing transaction encounters a read memory access targeting a given location in the shared memory, as in 215. As illustrated in 220 of FIG. 2, the method may include determining if the read access operation is an access operation to be validated as an invisible read. For example, the read access operation may be validated as an invisible read by default or may be part of a subset of read access operations that have been designated for validation as an invisible read based on a static analysis of the user code of the transaction (e.g., based on the predicted number of memory locations to be accessed, a predicted number of accesses to particular locations or sets of locations managed by a single ownership record, etc.), or on a dynamic analysis (an example of which is described later). On the other hand, if the read access operation targets a location that is not to be validated as an invisible read (e.g., if it targets a location for which the transaction has already acquired ownership, and/or if it is statically or dynamically determined that it should not be validated as an invisible read), it may be validated as a semi-visible read, as described in more detail below.

If the read access operation is to be validated as an invisible read, shown as the positive exit from 220, the method may include the transaction recording an identifier and/or snapshot of the ownership record associated with the location targeted by the read access operation in an invisible reads subset of the transaction's read set (if it has not already been recorded in the invisible reads subset), and performing the read access operation, as in 240. As illustrated by the path from 240 to 245, the method may in some embodiments include the transaction attempting to validate reads to locations currently in its read set (those targeted by any previous read access operations) after this (and every) read access operation, as in 245. For example, the transaction may iterate over the recorded metadata associated with the transaction's invisible read subset (i.e. a subset of the transaction's read set corresponding to read access operations to be validated as invisible reads) to see if the reads are still valid, as described above, and may apply a semi-visible read validation technique to attempt to validate reads of locations for which read ownership has been acquired (e.g., by checking the value of a read-write conflicts counter to see if it has changed since the transaction began). Note that in the common case in which there are no conflicts, validating reads using a semi-visible technique may be performed more quickly and cheaply (in terms of latency and/or memory usage) than validating reads using an invisible read validation technique, since the validation need not include iterating over metadata for the entire read set to determine if there has been a conflict.

If the read access operation is not to be validated as an invisible read, i.e. if it is part of a subset of read access operations to be validated as a semi-visible read (e.g., by default, based on static or dynamic analysis, or because read ownership has already been acquired for the target location), shown as the negative exit from 220, the method may include the transaction validating the read access operation as a semi-visible read. For example, the method may include the transaction acquiring read ownership of the targeted location, and performing the read access operation, as in 230. As illustrated by the path from 230 to 245, the method may include the transaction attempting to validate any previous reads (using one or more suitable validation techniques) following this read access operation. If there are more read access operations within the atomic transaction, shown as the positive exit from 250, the operations illustrated in 215-245 may be repeated for each of the additional read access operations. If there are no more read access operations within the atomic transaction, shown as the negative exit from 250, the method may include the transaction attempting to validate all reads using one or more validation techniques prior to committing, as shown in 260. This may include attempting to validate any invisible reads (i.e. reads included in the invisible read subset) by iterating over the metadata of the invisible read subset, and attempting to validate reads to locations whose ownership it has acquired for reading (i.e. those of a second subset of read access operations) using a semi-visible read validation technique. For example, in some embodiments, the method may include comparing the current value of a read-write conflicts counter with a value captured at a point when the read set was known to be valid (e.g., at the beginning of the transaction). If the current value matches the previously captured value, the validation of the reads in this subset may be complete. Note that in various embodiments, if any of the attempts to validate transactional reads fails, the method may include aborting the current transaction. In such embodiments, the method may also include retrying the transaction one or more times (not shown).

Note that in some embodiments, if a transaction includes two or more read access operations targeting the same location in shared memory (or targeting multiple locations managed using the same ownership record), the transaction may perform one or more read access operations targeting this location (or set of locations) as invisible reads, and one or more subsequent accesses to this location (or set of locations) as semi-visible reads, as described above and illustrated in FIG. 1. For example, in some embodiments, all read access operations may be performed as invisible reads by default, until or unless it is determined that any subsequent read access operations should be performed as semi-visible reads.

In various embodiments, the system and methods described herein may be used to dynamically determine which of a variety of read validation techniques to apply when validating read access operations performed within an atomic transaction, and/or to determine whether to switch from one technique to another for a given transaction, for a given target location, or for a given set of locations (e.g., a set of locations managed by a single ownership record). For example, if the transaction has a small read set, it may be less expensive to use invisible reads for all read access operations and not to acquire read ownership of any of the targeted locations. In such cases, the cost of the incremental read validation of all of the targeted locations by iterating over their associated ownership records (orecs) may be less than the cost of the synchronization operations required to acquire and release read ownership for those locations. However, if the read set becomes large, it may be more cost effective to acquire read ownership for locations targeted by any subsequent read access operations, thus avoiding the incremental validation of the entire read set after each read access operation.

FIG. 3A illustrates one embodiment of a method for determining whether to acquire read ownership for read access operations dependent on the size of a transaction's read set. In this example, the system may be configured to perform all read access operations as invisible reads by default, in which case an identifier or snapshot of a location targeted by any read access operation (or of an ownership record associated therewith) may be added to the transaction's read set when the read access operation is performed. As illustrated in 300 of FIG. 3A, the method may include executing program instructions comprising one or more memory access operations (i.e. read and/or write access operations) to one or more locations in a shared memory within an atomic transaction. In this example, the executing transaction encounters a read memory access targeting a given location in the shared memory, as in 310.

As illustrated in 320 of FIG. 3A, the method may include determining if the read set of the transaction includes fewer than a pre-determined number of ownership records. If so, shown as the positive exit from 320, the method may include the transaction validating the read access operation as an invisible read. For example, the method may include the transaction recording an indicator of the ownership record associated with the location targeted by the read access operation in an invisible reads subset of the transaction's read set (if it has not already been recorded in the invisible reads subset), and performing the read access operation, as in 340. As in the previous example, the method may in some embodiments include the transaction attempting to validate reads to locations currently in its read set (those targeted by any previous read access operation) after this (and every) read access operation, as shown in 345. For example, the transaction may iterate over the recorded metadata associated with the invisible reads subset of its read set (e.g., ownership records associated with locations targeted by invisible reads) to see if these reads are still valid, and may apply a semi-visible read validation technique to attempt to validate reads of locations for which read ownership has been acquired (e.g., by checking the value of a read-write conflicts counter to see if it has changed since the transaction began). Note that in the common case in which there are no conflicts, validating reads using a semi-visible reads technique may be performed more quickly and cheaply (in terms of latency and/or memory usage) than validating reads using an invisible read validation technique, since the validation need not include iterating over metadata for the entire read set to determine if there has been a conflict.

If, however, the read set of the transaction includes more than the pre-determined number of ownership records, shown as the negative exit from 320, the method may include the transaction validating the read access operation as a semi-visible read. For example, the method may include the transaction acquiring read ownership of the targeted location, and performing the read access operation, as in 330. As illustrated by the path from 330 to 345, the method may include the transaction attempting to validate any previous reads (using one or more suitable validation techniques) following this read access operation. If there are more read access operations within the atomic transaction, shown as the positive exit from 350, the operations illustrated in 310-340 may be repeated for each of the additional read access operations. If there are no more read access operations within the atomic transaction, shown as the negative exit from 350, the method may include the transaction attempting to validate all of its reads using one or more validation techniques prior to committing, as shown in 370. This may include attempting to validate any invisible reads (i.e. reads included in the invisible read subset) by iterating over the metadata of the invisible read subset, and attempting to validate reads to locations whose ownership it has acquired for reading using a semi-visible read validation technique. For example, in some embodiments, the method may include comparing the current value of a read-write conflicts counter with a value captured at a point when the read set was known to be valid (e.g., at the beginning of the transaction). If the current value matches the previously captured value, the validation of the reads in this subset may be complete. Note that in various embodiments, if any of the attempts to validate transactional reads fails, the method may include aborting the current transaction. In such embodiments, the method may also include retrying the transaction one or more times (not shown).

Note that if there is high level of read sharing for a particular orec (that is, if there are many transactions concurrently reading location(s) that map to a single orec), the read acquisition for that orec may be expensive (i.e. may take a long time). For example, read acquisition of an orec may be considered expensive in systems that employ a SNZI in the read acquisition process due to high levels of sharing (since a SNZI may be a more expensive and complicated construct than a counter, e.g.). In another example, read acquisition of an orec may be considered expensive if it takes many retries of the synchronization operation to modify the orec to record the read acquisition. In some embodiments employing the mixed mode read validation methods described herein, the system may skip the acquisition of such an orec, and may instead validate reads associated with that orec using an invisible read validation technique, resulting in a relatively low additional cost for the read validation. Therefore, in some embodiments, the system may be configured to save the cost of acquiring particular ownership records that are likely to be expensive to acquire. In such embodiments, if it has been (or is likely to be) inexpensive to acquire a particular orec, the system may be configured to acquire it, but if it has been expensive to acquire that orec (or if it is likely that it will be expensive to acquire the orec), then the system may be configured to include that orec in an invisible reads subset of the transaction's read set.

In some embodiments, the system may initially (and/or by default) be configured to apply a semi-visible read validation technique until or unless it is determined that acquiring read ownership is expensive for one or more of the memory locations (or orecs associated therewith) in the read set. At that point, the system may be configured to stop acquiring read ownership for those locations/orecs, and to add them to an invisible reads subset of the read set. For example, a first transaction may initially attempt to acquire ownership of a particular memory location for reading using a CAS type operation on a counter, as described herein. If the attempt to acquire read ownership fails, the transaction may retry the attempt or move to a SNZI based read acquisition technique. Moving to a SNZI based read acquisition technique may be more expensive than employing a counter based read acquisition technique. Retrying many times (e.g., more than a pre-determined number of times) may also be expensive.

In some embodiments, the system may be configured to determine or track the number of attempts made to acquire read ownership of a particular memory location (and/or its orec) and to record an indication of the number of attempts (or an indication that a pre-determined number of attempts was exceeded). In another embodiment, the system may be configured to detect a move to a SNZI based read acquisition technique (e.g., by detecting the use of a SNZI, or a non-initial value in a SNZI), and/or to record an indication that a SNZI based read acquisition technique is in use for the particular memory location (and/or its orec). In yet another embodiment, the system may be configured to record information about which (and/or how often) each of the orecs encounters contention (as the transaction is executing), which may serve as one indication of how expensive it is to acquire ownership of each orec. In one example, the system may be configured to track, monitor, and/or record information indicating which, if any, orecs in a semi-visible subset of a transaction's read set had to be validated using a full validation due to detecting a change in the read-write conflicts counter, and which, therefore, may be considered expensive to validate using semi-visible techniques. If an indication is recorded and/or a determination is made that acquiring read ownership of a particular orec (or associated memory location) is (or has been) expensive during execution of one transaction, a subsequent transaction trying to acquire this orec may make use of this information and not even attempt to acquire read ownership of the orec, instead placing that orec in the invisible reads subset or its read set. For example, in some embodiments, a transaction may set a special bit in an orec when it successfully acquires it, indicating that it took too many attempts to do so. In other embodiments, a separate data structure may be used to record such information, e.g., a bit map, hash table, etc.

FIGS. 3B-3C illustrate one embodiment of a method for determining whether to acquire read ownership for read access operations dependent on a previously observed cost of acquiring read ownership. Specifically, FIG. 3B illustrates a method for recording an indication that acquiring read ownership for a given location in a shared memory is expensive, and FIG. 3C illustrates a method for determining whether to acquire read ownership for a given location in a shared memory based on such recorded information. As illustrated in 300 of FIG. 3B, the method may include executing program instructions comprising one or more memory access operations (i.e. read and/or write access operations) to one or more locations in a shared memory within an atomic transaction. In this example, the executing transaction encounters a read memory access targeting a given location in the shared memory, as in 310.

In this example, the system may be configured to validate all read access operations as semi-visible reads by default (i.e. until or unless it is determined that the cost of acquiring read ownership is too high), or may be configured validate a subset of read access operations as invisible reads and another subset of read access operations as semi-visible reads. In this example, for any of a number of reasons, the method may include the transaction validating the read access operation as a semi-visible read. For example, the method may include the transaction acquiring read ownership of the targeted location, and performing the read access operation, as in 330. If acquiring read ownership of the targeted location required one or more retries, and/or if the transaction resorted to the use of a SNZI indicator in order to acquire read ownership of the location (as described above), the method may include the transaction recording an indication that read ownership acquisition was expensive for the targeted location and/or for the ownership record associated with the targeted location. For example, such an indication may be included in a designated field in the ownership record itself, in some embodiments, or in a separate data structure configured to stored such information. This is shown in FIG. 3B as the positive exit from 335 and element 345. Note that other embodiments, other measures and/or criteria may be used to determine that read ownership acquisition is expensive.

If read ownership acquisition was determined not to be expensive, shown as the negative exit from 335, no such indication may be recorded. As illustrated in 365 of FIG. 3B, the method may include the transaction validating the read using a semi-visible read validation technique, as described herein. Note that in this example, the transaction may attempt to validate one or more other transactional reads as semi-visible reads and/or may attempt to validate one or more other transactional reads as invisible reads (not shown), and may repeat the operations illustrated in 330-365 for each of the read access operations validated using a semi-visible read validation technique.

FIG. 3C illustrates one embodiment of a method for determining whether to acquire read ownership for read access operations dependent on a previously observed cost of acquiring read ownership. In this example, the system may be configured to perform all read access operations as semi-visible reads by default, i.e. until or unless it is determined that the cost of acquiring ownership for a given location (or set of locations managed by a single ownership record) outweighs the corresponding costs associated with performing incremental read set validation for the given location(s). As illustrated in 300 of FIG. 3C, the method may include executing program instructions comprising one or more memory access operations (i.e. read and/or write access operations) to one or more locations in a shared memory within an atomic transaction. In this example, the executing transaction encounters a read memory access targeting a given location in the shared memory, as in 310.

As illustrated in 315 of FIG. 3C, the method may include determining if the ownership record associated with the location targeted by the read access operation includes an indication that acquiring read ownership of the target location would be expensive. For example, such an indication may have been stored in a designated field of the ownership record as a result of a method such as that illustrated in FIG. 3B. If so, shown as the positive exit from 315, the method may include the transaction validating the read access operation as an invisible read. For example, the method may include the transaction recording an indicator of the ownership record associated with the location targeted by the read access operation in an invisible reads subset of the transaction's read set, and performing the read access operation, as in 340. As in previous examples, the method may in some embodiments include the transaction attempting to validate reads to locations currently in its read set (those targeted by any previous read access operation) after this (and every) read access operation, as shown in 345. For example, the transaction may iterate over the recorded metadata associated with the invisible reads subset of its read set (e.g., ownership records associated with locations targeted by invisible reads) to see if these reads are still valid, and may apply a semi-visible read validation technique to attempt to validate reads of locations for which read ownership has been acquired (e.g., by checking the value of a read-write conflicts counter to see if it has changed since the transaction began). Note that in the common case in which there are no conflicts, validating reads using a semi-visible technique may be performed more quickly and cheaply (in terms of latency and/or memory usage) than validating reads using an invisible read validation technique, since the validation need not include iterating over metadata for the entire read set to determine if there has been a conflict.

If, however, there is no indication that acquiring read ownership of the target location would be expensive, shown as the negative exit from 315, the method may include the transaction validating the read access operation as a semi-visible read. For example, the method may include the transaction acquiring read ownership of the targeted location, and performing the read access operation, as in 330. As illustrated by the path from 330 to 345, the method may include the transaction attempting to validate any previous reads (using one or more suitable validation techniques) following this read access operation. If there are more read access operations within the atomic transaction, shown as the positive exit from 350, the operations illustrated in 310-360 may be repeated for each of the additional read access operations. If there are no more read access operations within the atomic transaction, shown as the negative exit from 350, the method may include the transaction attempting to validate all of its reads using one or more validation techniques prior to committing, as shown in 370. This may include attempting to validate any invisible reads (i.e. reads included in the invisible read subset) by iterating over the metadata of the invisible read subset, and attempting to validate reads to locations whose ownership it has acquired for reading using a semi-visible read validation technique. For example, in some embodiments, the method may include comparing the current value of a read-write conflicts counter with a value captured at a point when the read set was known to be valid (e.g., at the beginning of the transaction). If the current value matches the previously captured value, the validation of the reads in this subset may be complete. Note that in various embodiments, if any of the attempts to validate transactional reads fails, the method may include aborting the current transaction. In such embodiments, the method may also include retrying the transaction one or more times (not shown)

As previously noted, the methods described herein may in some embodiments be used to delay acquisition of one or more orecs for reading in order to perform read acquisition operations on two or more orecs back-to-back (i.e. using consecutive memory access operations). Postponing the read acquisition of some orecs may benefit performance in some cases, as experiments suggest that performing multiple CAS type operations back-to-back may often be more efficient than having them disbursed in between other non-synchronization-related code. In one example, if one or more orecs are to be moved from the invisible subset to the semi-visible subset of a transaction's read set (i.e. if it has been determined that it would be appropriate to stop validating reads incrementally, and to acquire ownership and use the read-write conflicts counter approach instead), the system may be configured to wait until there are two or more orecs (e.g., three) to be acquired, and then to attempt to perform all of these acquisitions back-to-back without executing any other code in between. In some embodiments, this approach may be less expensive than acquiring read ownership of one orec, executing some user code, acquiring read ownership of another orec, executing more user code, etc., especially if the user code includes one or more other memory access operations. As previously noted, in some embodiments, other types of operations (e.g., arithmetic operations, or any other operations other than memory access operations) may be executed between the consecutive memory access operations used to acquire read ownership of multiple orecs, without losing all of the performance benefits of acquiring read ownership of multiple orecs back-to-back.

In some embodiments configured to attempt to acquire two or more orecs back-to-back, the system may be configured to perform all of these attempts using a BEHTM transaction (i.e. within a single hardware transaction), which may result in even more performance improvement. In this case, the system may effectively trade the execution of a separate synchronization operation (e.g., a CAS type operation) for acquiring each one of the orecs, for the execution of a single hardware transaction that attempts to acquire them all together. In some embodiments, the system may be configured to temporarily refrain from acquiring at least some of the orecs associated with memory locations targeted by a transaction's read access operations, until the cost of the incremental read validation of these orecs becomes too high, at which point it may use a single hardware transaction to attempt to acquire them all at once.

Figure 4:
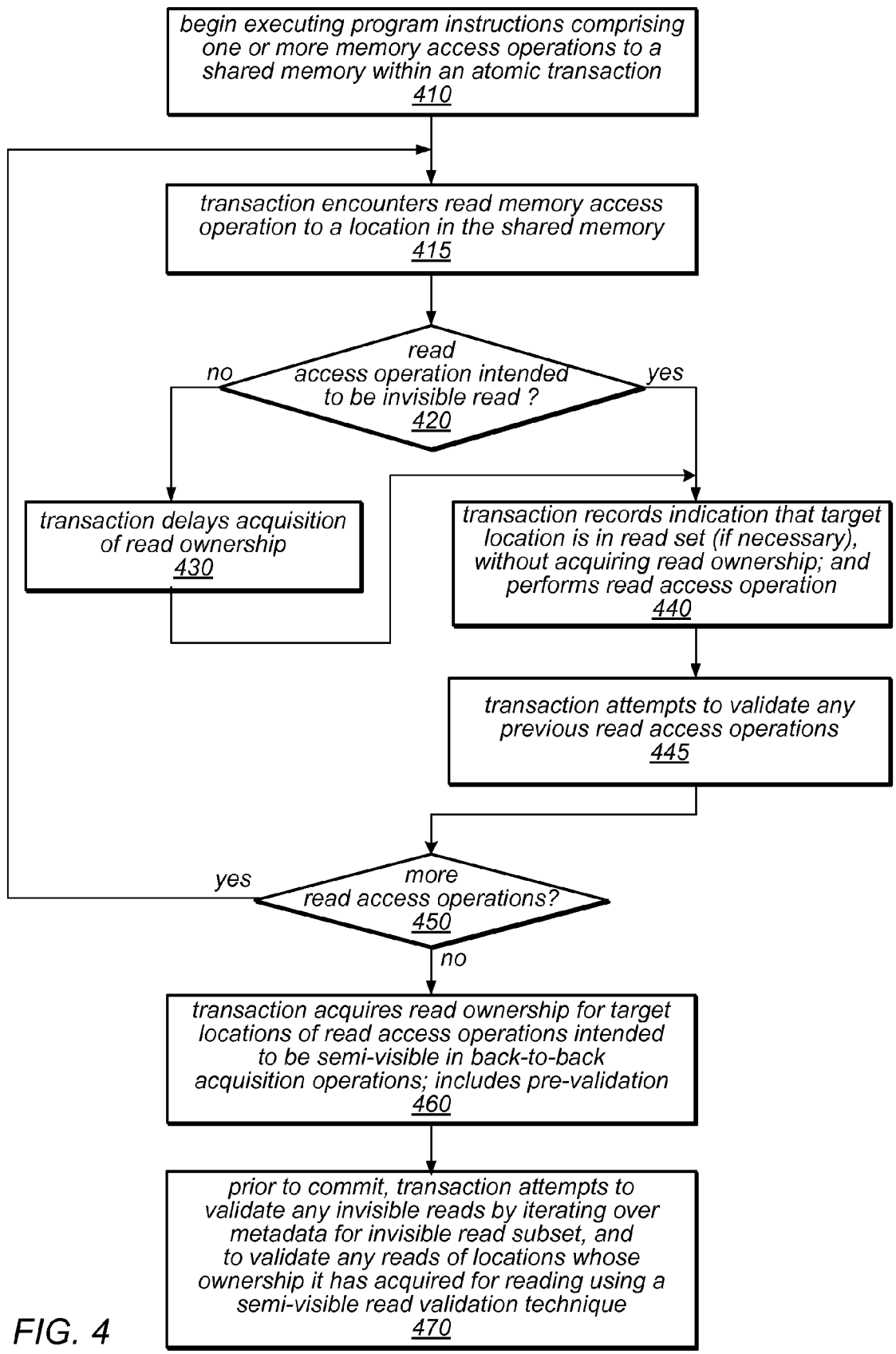
FIG. 4 is a flow diagram illustrating one embodiment of a method for using two different techniques to validate read operations of a single transaction comprising delaying acquisition of read ownership for one or more target locations, as described herein.

Another embodiment of a method for dynamically using different techniques to validate transactional read access operations is illustrated in FIG. 4. As in previous examples, different techniques may be used to validate reads targeted to different memory locations by the same transaction, or to validate reads to the same memory location at different points within a single transaction. For example, one or more read access operations (which may comprise a subset of all read access operations within the atomic transaction) may be validated as invisible reads, while one or more other read access operations (which may comprise a different subset of the read access operations within the atomic transaction than those performed as invisible reads) may be validated as semi-visible reads by applying different techniques to validate the read access operations in each subset. However, in the example illustrated in FIG. 4, acquisition of read ownership for the locations targeted by the subset of read access operations validated as semi-visible reads may be delayed until there are two or more ownership records to be acquired for reading, and these ownership records may be acquired in bulk, using back-to-back operations, as described above.

As illustrated in 410 of FIG. 4, the method may include executing program instructions comprising one or more memory access operations (i.e. read and/or write access operations) to one or more locations in a shared memory within an atomic transaction. In this example, the executing transaction encounters a read memory access targeting a given location in the shared memory, as in 415. As illustrated in 420 of FIG. 4, the method may include determining if the read access operation is an access operation to be validated as an invisible read, i.e. if it is part of a subset of read access operations designated for validation as an invisible read, as described above. If so, shown as the positive exit from 420, the method may include the transaction validating the read access operation as an invisible read. For example, the method may include the transaction recording an indicator of the ownership record associated with the location targeted by the read access operation in an invisible reads subset of the transaction's read set (if it has not already been recorded in the invisible reads subset), and performing the read access operation, as in 440. As in previous examples, the method may in some embodiments include the transaction attempting to validate reads to locations currently in its read set (those targeted by any previous read access operation) after this (and every) read access operation, as shown in 445. For example, the transaction may iterate over the recorded metadata associated with the invisible reads subset of its read set to see if the reads are still valid, as described above, and may apply a semi-visible read validation technique to attempt to validate any reads of locations for which read ownership has already been acquired (e.g., by checking the value of a read-write conflicts counter to see if it has changed since the transaction began).

If, however, the read access operation is not to be validated as an invisible read, i.e. if it is part of a subset of read access operations designated for validation as a semi-visible read, shown as the negative exit from 420, the method may include the transaction performing the read access operation as if it were an invisible read. In other words, in this example, even though the read access operation is intended to be validated using a semi-visible read validation technique, the transaction may not acquire read ownership of the targeted location before performing the read access operation. Instead, it may delay the acquisition of read ownership for the target location until later, and may perform the read access operation as if it were intended to be validated as an invisible read. This is shown as the path from 430 to 440 in FIG. 4. If there are more read access operations within the atomic transaction, shown as the positive exit from 450, the applicable operations illustrated in 415-445 may be repeated for each of the additional read access operations.

If there are no more read access operations within the atomic transaction, shown as the negative exit from 450, the method may include acquiring read ownership for target locations of the read access operations intended to be included in the semi-visible subset of read access operations using back-to-back ownership acquisition operations. This is illustrated in 460. As illustrated in 460 of FIG. 4, the method may include pre-validating the locations intended to be verified using semi-visible techniques before acquiring read ownership of these locations (e.g., by confirming that the contents of the ownership records associated with these locations have not changed since snapshots of these ownership records were recorded in the invisible reads subset). In this way, the transaction may determine whether a write access operation of another transaction may have changed the value of any of these locations between the read and the acquisition of read ownership, even though it would not have updated the read-write conflicts counter. The method may also include removing metadata associated with these locations from the invisible reads subset after acquiring read ownership of them (not shown). In other embodiments, metadata associated with the locations intended to be verified using semi-visible techniques but for which read acquisition is delayed may be stored in a data structure other than the one storing metadata associated with locations intended to be in the invisible read subset, and pre-validation of these locations may include iterating over this other data structure, rather than over the invisible read subset. Note that in other embodiments, the operations illustrated in 450 and 460 of FIG. 4 may (generally speaking) be reversed. In such embodiments, the system may not perform all delayed read acquisitions at the same time. Rather, read ownership for two or more delayed read acquisitions may be acquired together (e.g., using a hardware transaction), and then execution of the atomic transaction may be resumed. Subsequently, read ownership for one or more other delayed read acquisitions may be acquired (e.g., individually or collectively).

As shown in the example illustrated in FIG. 4, the method may include the transaction attempting to validate all of its reads using one or more validation techniques prior to committing, as shown in 470. This may include attempting to validate any invisible reads (i.e. reads included in the invisible read subset) by iterating over the metadata of the invisible read subset, and attempting to validate reads to locations whose ownership it has acquired for reading using a semi-visible read validation technique. For example, in some embodiments, the method may include comparing the current value of a read-write conflicts counter with a value captured at a point when the read set was known to be valid (e.g., at the beginning of the transaction). If the current value matches the previously captured value, the validation of the reads in this subset may be complete. Note that in various embodiments, if any of the attempts to validate transactional reads fails, the method may include aborting the current transaction. In such embodiments, the method may also include retrying the transaction one or more times (not shown)

In some embodiments, the system described herein may be configured to divide the execution of a software transaction into a number of "segments" to be executed separately (e.g., sequentially), and to then attempt to commit the results of the segments together, as if they had been executed as a single transaction. For example, the transaction may be divided into segments by a complier (with or without input from the programmer), or may be divided into segments dynamically (e.g. at runtime) dependent on the number and/or distribution of memory access operations, the current workload, the amount of contention experienced in the system, or any other suitable criteria. In some such embodiments, segments that are likely to successfully execute in a best effort HTM system (e.g., using a static analysis of the user code of the transaction or by any other suitable means) may be identified as such (and an indication of this may be recorded) and optimized to leverage the HTM system. In some such embodiments, each segment may be executed within a separate hardware transaction, and the system may be configured to acquire ownership of all the reads performed in the segment only at the end of this segment. Note that in some such embodiments, the methods employed when performing transactional writes within a hardware transaction may be the same as those employed by the STM (e.g., maintaining read and write sets for use in subsequent validation and commit operations). For example, a hardware transaction used to implement one of the segments may record transactional writes in a private write set until the commit phase for the entire software transaction, during which they may be copied back to shared memory. Since each segment is run inside a hardware transaction, there may be no need for incremental validation of any un-acquired orecs while executing the segment because the underlying HTM may be configured to guarantee that the values read are consistent with each other. Note, however, that after each read, the system may still need to check that no writer transaction owns the associated orec. This check may in some embodiments be used to guarantee that inconsistent data is not read due to a partially committed software transaction, which could also cause an erroneous execution of the segment. In other words, the hardware transaction may ensure consistency as long as no other software transactions are writing data to the same locations. Therefore, when running user code within a hardware transaction, the system may be configured to determine that none of the locations being read by the hardware transaction are being modified by any software transaction by checking the associated orec(s) to be sure they are not owned for writing by any software transaction(s).

When using the segmenting technique described herein, reads from previous segments may be validated using a single read of the read-write conflicts counter (in the common case that there is no contention) since they are guaranteed to be read-acquired at this point. Thus, in some embodiments, the system may be able to eliminate a large share of validation operations that might otherwise have been required following each read performed by the user code of the transaction. In such operations, the system may be configured to store the same information in the read set and the write set that would be stored by any STM transaction (or similar information), and many of the same operations performed by a typical STM may be performed. However, it may not be necessary to validate the read set after every read, because if anything in the read set changes, the hardware transaction will be aborted. In some embodiments, leveraging these properties may allow the system to run ahead (i.e. to execute the user code of a transaction speculatively) without worrying about what has changed (yet). In such embodiments, reads and writes may be recorded in the read set and write set as the transaction executes, and then just before ending the segment, the system may acquire all of the orecs for the read set (i.e. within the hardware transaction). Using a hardware transaction to acquire all of the orecs may cause the transaction to abort if the values stored in locations read by the hardware transaction have changed since they were read by the hardware transaction.

Figure 5:
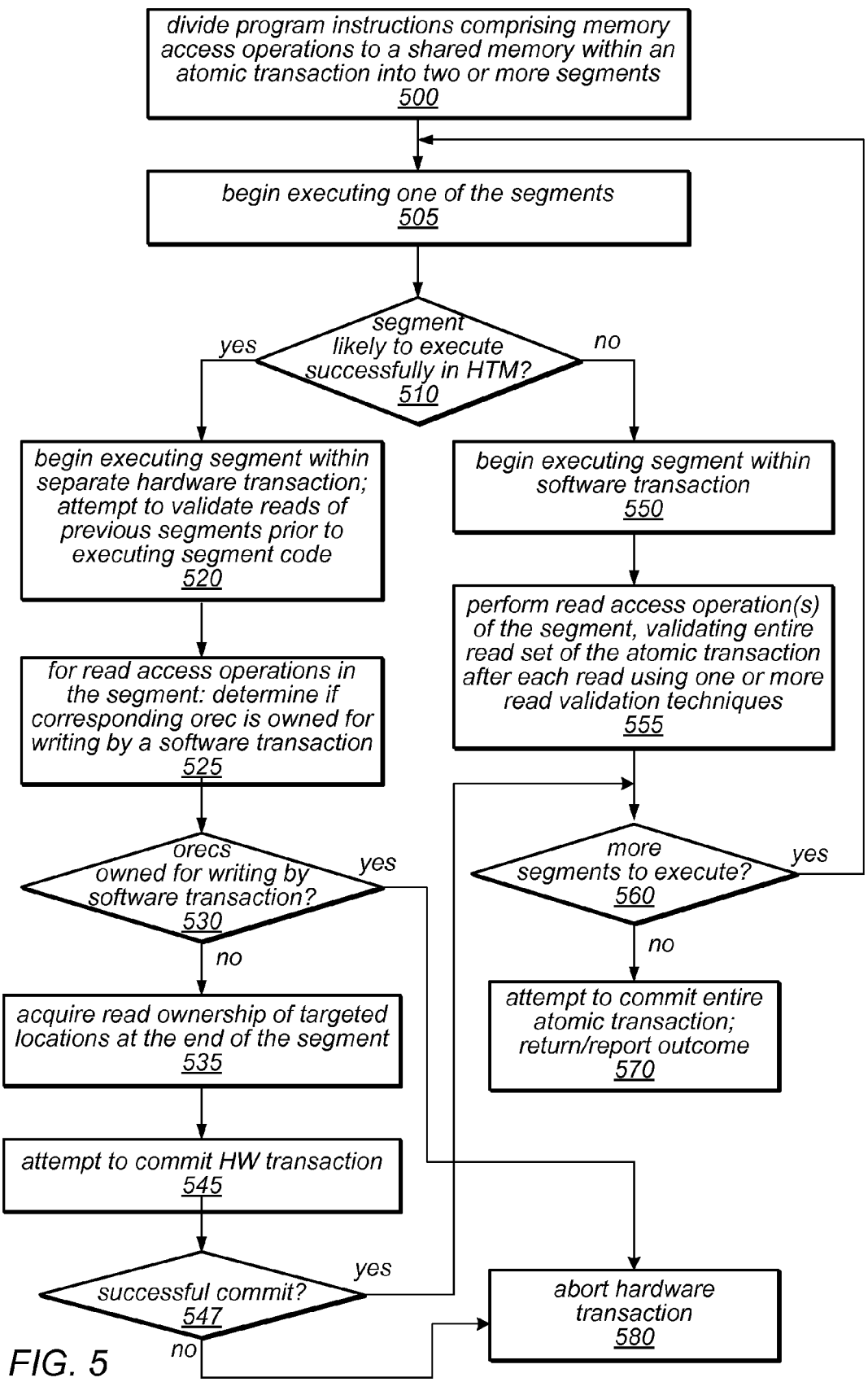
FIG. 5 is a flow diagram illustrating one embodiment of a method for executing a transaction in two or more segments, some of which may be executed using a hardware transaction, as described herein.

One embodiment of a method for dynamically applying different techniques to validate transactional read access operations in different segments of an atomic transaction is illustrated in FIG. 5. As illustrated in this example, the method may include dividing program instructions comprising one or more memory access operations to one or more locations in a shared memory within an atomic transaction into two or more segments for execution, as in 500. As previously noted, executing each segment may include recording information indicating the locations targeted by the read access operations and write access operations performed within those segments in the read and write sets of the overall atomic transaction, respectively. The method may include beginning execution of one of the two or more segments, as in 505, and determining if the segment is likely to execute successfully within a hardware transaction, as in 510. For example, in some embodiments, a static analysis of the user code within each segment may be performed to predict the likelihood that it can be successfully executed within a hardware transaction, or a dynamic analysis may be applied to determine if the segment is likely to be successfully executing within a hardware transaction (e.g., based on past performance, or current conditions).

If the segment is likely to execute successfully using a hardware transaction, shown as the positive exit from 510, the method may include executing the segment within a separate hardware transaction (using BEHTM, e.g.), as in 520-545. In this case, the method may include validating any read access operations performed as part of previously executed segments prior to executing the segment code. Otherwise, if the data read by the current segment is inconsistent with that read by a previous segment, various errors may occur that may prevent the hardware transaction from reaching a point at which it validates reads. As illustrated in FIG. 5, the method may include, for one or more read access operations within the segment, determining whether the corresponding ownership record is owned for writing by another software transaction, as in 525. For example, the method may include determining if a write ownership status bit of the orec is set and/or if a current writer field of the orec indicates that the orec is currently owned for writing. If not, shown as the negative exit from 530, the method may include the hardware transaction acquiring read ownership of the locations targeted by the one or more read access operation within the segment, as in 535. Read access operations performed as part of previous segments and for which read ownership has been acquired may in some embodiments be validated using a single read of a read-write conflict counter, since they are guaranteed to be read-acquired at this point.

As illustrated in FIG. 5, the method may then include attempting to commit the hardware transaction for the current segment, as in 545. Note that committing the hardware transaction for the current segment may not commit the results of this segment to shared memory, but may serve as an intermediate or preliminary commitment of the results of the segment. Instead, committing the hardware transaction may commit the results of the segment to a private write set of the atomic transaction. As illustrated in FIG. 5, if the ownership record for any of the locations targeted by read access operations within the segment is already owned by another software transaction, shown as the positive exit from 530, or if the attempt to commit the hardware transaction for the segment (at 545) fails, shown as the negative exit from 547, the hardware transaction may in some embodiments be aborted, as in 580. In various embodiments, an aborted hardware transaction (or a hardware-implemented segment of a software transaction) may be retried one or more times (e.g., beginning at 520 in FIG. 5) within a subsequent hardware transaction or by resorting to the use of software transactional memory instead. In some embodiments, if the hardware transaction is aborted, the entire atomic transaction may be aborted (e.g., after zero or more unsuccessful attempts to complete the segment within a hardware transaction or using software transactional memory). If the attempt to commit the hardware transaction for the segment (at 545) is successful, shown as the positive exit from 547, the method may include determining if there are more segments to be executed, as in 560.

As illustrated in this example, if a segment is unlikely to execute successfully using a hardware transaction, shown as the negative exit from 510, the method may include executing the segment using software transactional memory techniques, as in 550-555. For example, the method may include the software transaction performing one or more read access operations of the segment (as invisible and/or semi-visible reads), and attempting to validate the entire read set of the atomic transaction following each read access operation, as illustrated in 555. In other words, following each read access operation of the segment, the method may include the software transaction validating all previous read access operations of the atomic transaction using one or more validation techniques, such as those described herein. For example, in some embodiments, the software transactional memory may apply semi-visible read validation techniques to a subset of the read access operations of the atomic transaction and invisible read validation techniques to a different subset of the read access operations of the atomic transaction.

If there are more segments to execute, shown as the positive exit from 560, the method may include repeating any or all of the operations illustrated in 510-555 for these additional segments, as shown. Once all of the segments have been executed, the method may include attempting to commit the entire atomic transaction and returning (or reporting) the outcome of the attempt, as in 570. If the attempt to commit the atomic transaction succeeds, the method may include copying the results of any write access operations performed as part of the atomic transaction to shared memory (not shown). If the attempt to commit the atomic transaction fails, the method may include aborting the atomic transaction such that none of the results of write access operations performed as part of the atomic transaction are copied to shared memory, and may include retrying the transaction (not shown).

As previously noted, executing user code with inconsistent data may in some situations cause erroneous behavior, such as the code attempting illegal operations (e.g., divide by zero, referencing a pointer to an invalid location in memory, etc.), or may cause other problems that could make an application crash. Sandboxing is a feature commonly supported in best effort HTMs. When executing code under a sandboxed environment, its effects may be undone in the event that they result in an erroneous behavior. Thus, in a sandboxed environment, it may be permissible to run a software transaction with potentially inconsistent data since any resulting erroneous behavior may be easily (and/or automatically) undone. In some embodiments, the sandboxing ability of most best effort HTM systems may be leveraged to further improve (i.e. reduce) the cost of validating read operations of transactions. For example, it may be possible to use HTM to execute segments of a transaction, without validating or even checking the ownership of the orecs associated with each location read within the segment until such time as the effects of the segment become visible to any code that is not running in a sandboxed environment (e.g., another segment of the same transaction executing in STM or another software transaction). This is because when running in HTM (in many cases), the HTM may abort the transaction if the data was inconsistent, and if continuing execution with the inconsistent data results (or would result) in erroneous behavior or an illegal operation or condition (such as those described above). In such embodiments, the system may be configured to execute the user code of a transaction speculatively, knowing that if the transaction operates on inconsistent data that would result in erroneous behavior, it may be aborted. In this case, any errors that might have been caused by executing the user code with inconsistent data would not be realized (i.e. the reads and writes that would have caused the error will not be committed to the system's shared memory). Note that if a transaction is aborted too many times (e.g., more than a pre-determined number of times), the system may be configured to apply a more expensive technique for read validation. However, in general (in such embodiments), the system may be configured to postpone a check of whether a software transaction is writing to a location that a hardware transaction is reading while executing the segment in the sandboxing environment. In some embodiments, the system may be configured to capture the read set of any hardware transaction used to execute one of the segments of the atomic transaction, so that it may be validated along with the rest of the atomic transaction prior to committing the results of the entire transaction (i.e. the results of all of its segments). In such embodiments, the system may not even acquire orecs at end of segment, but may instead perform full validation later, when attempting to commit the entire transaction.

Note that in systems in which sandboxing is supported, segmenting a software transaction into multiple parts (e.g., so that one or more of them may be executed using a hardware transaction) may not violate the atomicity of the software transaction, since the transaction may continue to use deferred writing techniques for write buffering any transactional writes performed by each segment. In other words, writes performed by each segment (using hardware or software transactional memory techniques) may not be committed to shared memory on a per-segment basis, but may only be committed once the entire transaction has been executed and the consistency of the transaction's read and write accesses has been validated. Thus, it may only be necessary to validate the transactional reads (e.g., using full validation of the orec snapshots) at the end of the software transaction, and whenever a segment is encountered that cannot be sandboxed (e.g., because it contains an instruction that simply cannot be executed by the best effort HTM). As a consequence, if all segments of a transaction can be sandboxed successfully, it may not be necessary (or desirable) to acquire any of the orecs for reading, since performing a read validation at commit time may be cheaper than acquiring and releasing ownerships. Conversely, if a software transaction consists of many segments that cannot be sandboxed, it may in some embodiments be worthwhile to acquire the appropriate orecs for reading so that repeated incremental read validation can be replaced by a semi-visible read validation technique based on a read-write conflict counter, for example. As described above, in some embodiments two or more read acquisitions may be grouped together and executed in a single hardware transaction. Thus, in such embodiments, the system may be able to eliminate the majority of the overhead associated with both invisible and semi-visible read validation techniques.

Figure 6:
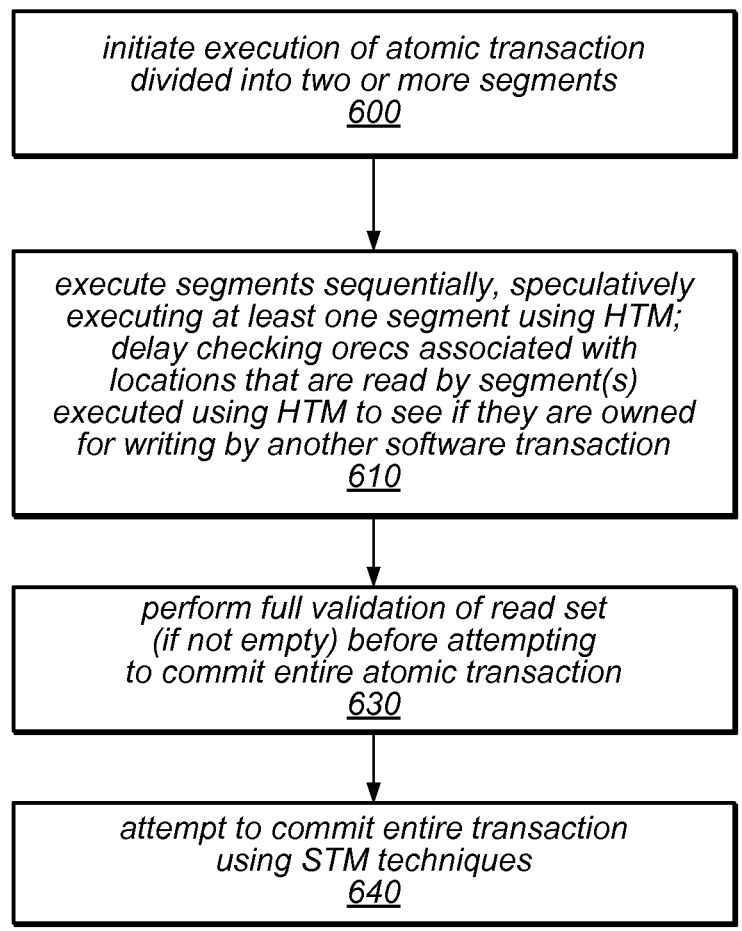
FIG. 6 is a flow diagram illustrating one embodiment of a method for leveraging the sandboxing capability of a best effort hardware transactional memory system to reduce the cost of validating transactional reads, as described herein.

One embodiment of a method for leveraging the sandboxing capability of a best effort HTM system to reduce the cost of validating transactional reads is illustrated in FIG. 6. As illustrated in FIG. 6, the method may include initiating execution of an atomic transaction, as in 600. In this example, the atomic transaction may be divided into two or more segments for execution, as described herein. As illustrated in 610 of FIG. 6, the method may include executing the two or more segments sequentially. In this example, the method may include speculatively executing at least one of these segments using best-effort hardware transactional memory, and delaying checking any ownership records associated with locations targeted by read access operations within these segments (i.e. segments executed using BEHTM) to see if they are owned for writing by another software transaction. Other segments may be executed using STM techniques, in this example. Note that executing each segment may include recording information indicating the locations targeted by the read access operations and write access operations performed within those segments in the read and write sets of the transaction, respectively.

As illustrated in 630 of FIG. 6, the method may include performing a full validation of the atomic transaction's read set (if not empty) before attempting to commit the entire atomic transaction, as in 640. For example, the method may include iterating over an invisible reads subset of the read set of the transaction to determine whether values read by the transaction have been modified since they were read, and/or comparing the current value of a read-write conflicts counter with a value captured at a point when the read set was known to be valid (e.g., at the beginning of the transaction). In this example, the overall atomic transaction may be committed using STM techniques, as shown.

As described above, if a software transaction can be divided into multiple segments, each of which can be executed using a hardware transaction, performance may be improved (e.g., latency may be reduced) by executing the transaction speculatively within a hardware transaction (assuming the system supports sandboxing). In such cases, the transaction will either operate on consistent data or, if not (and if this causes anything illegal or undesirable to happen), the transaction will be aborted and any resulting errors will not be realized. In the case that the transaction successfully executes with consistent data (which may be the common case), the system may only need to perform one read validation operation at the end. If one or more of the segments cannot be executed inside a hardware transaction, before executing such a segment in software, the system may be configured to validate (e.g., in software) the read set up to that point (i.e. all previous reads), since STM techniques do not typically provide the sandboxing features described above. In some embodiments, before executing such a segment in software, the system may be configured to acquire read ownership of one or more locations to reduce the cost of further validations in that segment.

In one example, suppose there is a segment that will be executed using STM, and the system has not yet acquired any orecs. In this case, all of the reads are assumed to be included in the invisible reads subset of the read set. However, if the segment is very long (e.g., if includes lots of read operations), the system may be configured to dynamically switch to a semi-visible read validation technique instead. In this case, all of the applicable orecs that have not yet been acquired for read before executing this segment orecs may be acquired. This may avoid the possibility that a very large read set must be validated after every read in the segment, and therefore, the benefit of acquiring these orec(s) may be worth the cost. As described above, the system may in some embodiments be configured to determine when it gets too expensive to validate the read set after every read and when it may be appropriate to switch to using a semi-visible read technique. In a system that supports sandboxing, the point at which the benefits of semi-visible read validation outweighs the cost may be different than in a system that does not support sandboxing. This is because all of the cost of doing invisible read validation after every read may be necessary when executing a transaction exclusively in STM, but if one or more segments of the transaction can be executed in HTM, it may not need to be done.

Note that in a hybrid transactional memory system (HyTM), some user transactions may be executed completely in hardware. In such systems, the use of the mixed mode validation techniques described herein may result in some additional overhead to the hardware transactions that execute user code, as these may have to modify the orecs corresponding to any locations they have written. For example, if a hardware transaction wishes to write to a memory location, it needs to determine whether any software transaction owns it for reading or writing, which may result in a conflict. With semi-visible reads, the hardware transaction may simply check the orec associated with the target location to see whether it is owned for reading. However, when invisible reads are used the hardware transaction cannot detect conflicts with reads done by concurrently executing software transactions, and may need to rely on the software transactions to detect such conflicts and abort. Thus, for a system supporting mixed read validation to detect a conflict with a hardware transaction over an orec that it has not acquired for reading, the hardware transaction may need to modify that orec whenever it writes a memory location with which it is associated to indicate that it has written to the location (e.g., by writing a particular value in a designated field of the orec). In this way, concurrently executing software transaction readers may detect the conflict with the hardware transaction. In other words, in embodiments supporting mixed read validation, and in which some transactions are visible and some are invisible, a concurrently executing hardware transaction cannot depend on the existence of an indication of read ownership in the associated orec, and may incur overhead similar to that incurred whenever invisible reads are performed by concurrently executing transactions.

In some embodiments, it may be possible to record an indication (e.g., in an associated ownership record) that read accesses to one or more memory locations will always be implemented as invisible reads or an indication that they will never be implemented as invisible reads. For example, in various embodiments, system or user code may set a special bit in the orec indicating that read accesses to locations associated with that orec should always (or never) be implemented as invisible reads. In other embodiments, a separate data structure may be used to record such information, e.g., a bit map, hash table, etc. If some ownership records include an indication that read accesses to associated locations will always be implemented as invisible reads, a hardware transaction writer may only need to incur the additional overhead described above when writing to those locations, and not for all write accesses to the shared memory. If other ownership records include an indication that read accesses to associated locations will never be implemented as invisible reads, a hardware transaction that writes to those locations may not need to modify these ownership records to notify other (software) transactions of potential conflicts. In some embodiments, when compiling instructions to be executed as a hardware transaction, the compiler may produce executable code that allows read operations to be done within a hardware transaction, but that first checks the associated ownership record to see if the targeted memory location is owned for writing. The code produced by the compiler may also add an operation to modify the ownership record in the case of transactional writes, as described above. In addition, the code produced by the compiler may add a check for this modification of the ownership record to the software transactions to be executed concurrently with the hardware transaction so that the software transactions can detect the potential conflict.

As described herein, each location in shared memory may be associated with an ownership record, which may be used in managing concurrent read and/or write accesses to that location (and, optionally, one or more other locations in the shared memory), according to various embodiments. In various embodiments, an ownership record may include an indication of whether the one or more locations are owned for reading and/or writing, along with other information used to manage concurrent read and/or write accesses to those locations. For example, an ownership record may include an identifier of the latest transaction to have owned the associated memory locations for writing (which may identify a current writer), and/or an indication of the number of transactions that own the associated memory locations for reading (i.e. a reader count). In some embodiments, another data structure (i.e. a read ownership array) may store data indicating which, if any, threads currently own the associated memory locations for reading. For example, if the read ownership array includes k single-byte entries, data stored in each entry (or slot) in the array may indicate whether a corresponding one of k threads, denoted as slotted threads, owns the one or more locations for reading. In some such embodiments, a memory area (and/or its ownership record) may be said to be owned for writing if and only if its write ownership status bit indicates so (e.g., if it is non-zero). The memory area (and/or its ownership record) may be said to be owned for reading if and only if one or more of the entries in its read ownership array is non-zero, and the write ownership status bit indicates that it is not owned for writing. Otherwise, the memory area and its ownership record may be considered free (not owned). In various embodiments that support semi-visible read validation techniques, such as those described herein, the system may include one or more read-write conflict indicators, such as a local read-write conflict flag for each thread or transaction, and/or a global read-write conflict indicator. For example, a writer transaction may determine whether any other transactions own a given location for reading, and if so, may set a local read-write conflict indicator (i.e. one that is private to the writer transaction, such as a thread-local flag) to indicate a potential read-write conflict. The system may include a global read-write conflict counter, which may be used to avoid iterating over the transaction's semi-visible reads subset, in many cases. In such embodiments, at the beginning of a transaction, the value of the global read-write conflict counter may be recorded. When the transaction attempts to commit, if its local read-write conflict indicator is set, it may increment the global read-write conflict counter. If, when attempting to commit the transaction, a current value of the global read-write conflict counter (e.g., the value of the global read-write conflict counter immediately before it may be conditionally incremented by the transaction attempting to commit) does not match the value recorded at the beginning of the transaction execution, a full validation of the transaction's semi-visible reads subset may be performed to determine if an actual read-write conflict has occurred. Otherwise, the semi-visible reads subset may be considered valid and the transaction may commit without performing the full validation.

In some embodiments, when read ownership is revoked, the owners are not notified and aborted. In such embodiments, it may be each reader's responsibility to validate its own read set and to abort itself if any of its read ownerships have been revoked. In some embodiments, when a transaction acquires read ownership of a set of one or more locations associated with an ownership record and corresponding read ownership array, the transaction may record a snapshot including an identifier of the last transaction that owned the one or more locations for writing. These snapshots may be kept in a private read set, and subsequently used to validate the transaction, i.e., to determine whether any of the transaction's read ownerships have been revoked. In various embodiments, a completed transaction, whether committed or aborted, may relinquish all of its ownerships.

Note that, in some embodiments, if a writing transaction fails to increment the read-write conflict counter due to another transaction having successfully incremented it (e.g., using a CAS-type operation), then it may not be necessary for the writing transaction to retry the increment. This is because the increment performed by the other transaction may serve the same purpose as the increment attempted by the writing transaction.

Figure 7A:
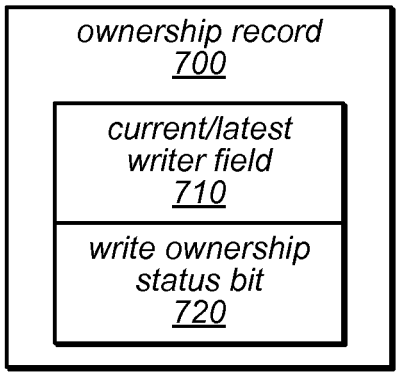
FIGS. 7A-7E illustrate various embodiments of ownership records and other data structures associated with a memory area in a transactional memory system, as described herein.

As described herein, each location in shared memory may be associated with an ownership record, which may be used in managing read and/or write accesses to that location (and, optionally, one or more other locations in the shared memory), according to various embodiments. FIGS. 7A-7E illustrate various ownership records and other data structures associated with each location (or memory area), according to different embodiments. These data structures are merely examples of data structures that may be used in managing transactional memory accesses, and are not meant to be limiting. In other embodiments, more, fewer, or different data structures may be employed in transactional memory systems, and those data structures may include more, fewer, or different fields. In one example, FIG. 7A illustrates an ownership record 700 that includes a write ownership status bit 720 (indicating whether or not the associated memory area is currently owned for writing by a software transaction), and a current/latest writer field 710 (comprising an indication of the transaction, if any, that currently owns the memory area for writing, or, if the memory area is not currently owned for writing, an indication of the latest transaction to have owned the memory area for writing). In some embodiments, a transaction may use a CAS type operation to update the write ownership status bit 720 and/or current/latest writer field 710 when acquiring and/or releasing write ownership.

Figure 7B:
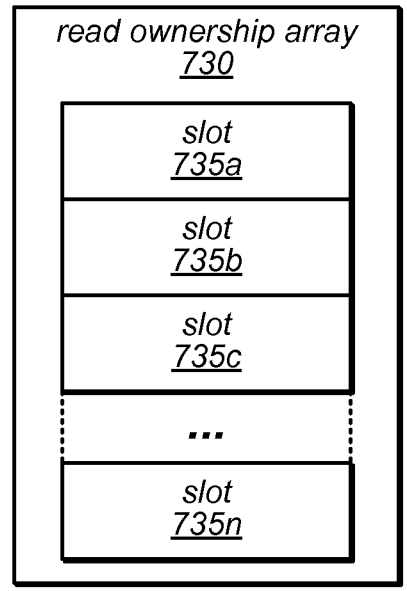

In some embodiments, ownership record 700 of FIG. 7A may be associated with a read ownership array 730, such as that illustrated in FIG. 7B. As illustrated in FIG. 7B, read ownership array 730 may include an array of entries (e.g., bytes), each indicating whether a corresponding thread owns the memory area for reading. In other words, read ownership array 730 may record information identifying the threads executing transactions that own the associated memory area for reading. In some embodiments, all threads are "slotted", i.e., each thread in the system corresponds to a dedicated entry in each read ownership array. For example, read ownership array 730 may include one or more slots 735a-735n, each indicating whether a corresponding thread a-n owns the associated memory area for reading. In this example, a memory area (and/or its ownership record) may be owned for writing if and only if its write ownership status bit indicates so (e.g., if it is non-zero), and the memory area (and/or its ownership record) may be owned for reading if and only if one or more of the entries in its read ownership array is non-zero, and the write ownership status bit does not indicate that it is owned for writing. Otherwise, the memory area and its ownership record may be considered to be free (not owned). In this example, to acquire ownership record 700 for reading, a transaction may first check the write ownership status bit 720 to determine if the ownership record is owned for writing. If not, the transaction may update the appropriate entry 735 of the read ownership array 730 associated with ownership record 700 to indicate that the transaction owns the ownership record for reading, and then may check the write ownership status bit 720 again to ensure that it has not been set since the last time it was checked and that the ownership record is now owned for reading.

Figure 7C:
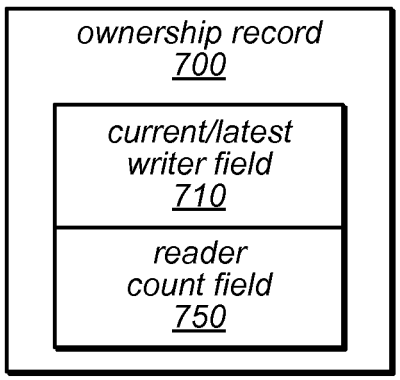
Figure 7D:
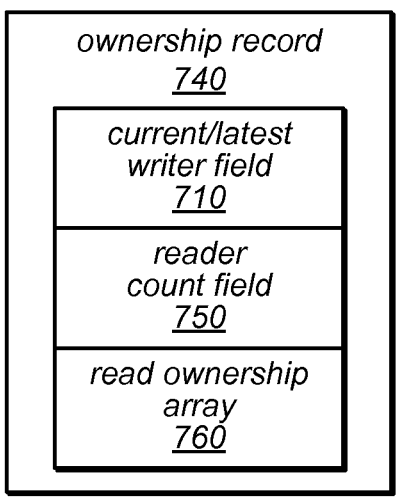

FIG. 7C illustrates an ownership record 780, according to a different embodiment. In this example, ownership record 780 includes a current/latest writer field 710, such as that described above, and a reader count field 750 (indicating the number of transactions that currently own the associated memory area for reading without identifying the particular transactions). In some embodiments, a transaction may use a CAS type operation to attempt to acquire read ownership of one or more memory locations associated with ownership record 780. For example, a transaction may use a CAS type operation to atomically check that there is no current writer and (if not) to update the reader count field 750. In other embodiments, a scalable non-zero indicator (not shown) may be included in an ownership record instead of, or in addition to, a reader count field 750 that represents a specific counter value. In some embodiments, a transaction may update reader count field 750 using a CAS type operation if there is no current writer. FIG. 7D illustrates an ownership record 740, according to another embodiment. In this example, ownership record 740 includes a current/latest writer field 710 and reader count field 750, such as those described above, and a read ownership array 760. In this example, read ownership array 760 may include one or more entries, each indicating whether a corresponding transaction currently owns the associated memory area for reading. In some embodiments, read ownership array 760 may include entries similar to slots 735a-735n, described above. In such embodiments, each slot may be associated with a particular thread. In other embodiments, read ownership array 760 may include a list of entries, each comprising an identifier of a transaction that currently owns the associated memory area for reading.

Figure 7E:
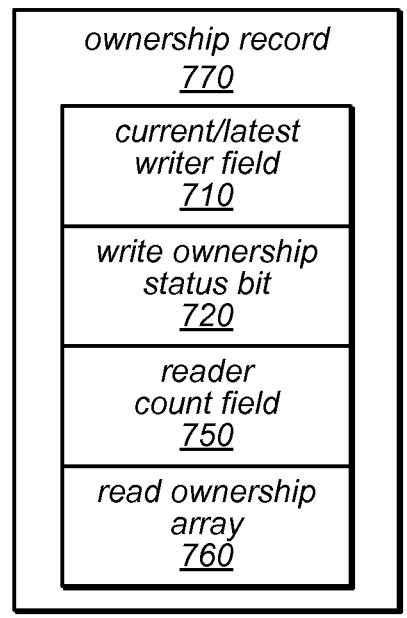

FIG. 7E illustrates an ownership record 770, according to yet another embodiment. In this example, ownership record 770 includes a current/latest writer field 710, a write ownership status bit 720, a reader count field 750, and a read ownership array 750. In various embodiments, these elements of ownership record 770 may be similar to those illustrated in FIGS. 7A-7D, and described above. As previously noted, in other embodiments, more, fewer, or different data structures may be employed in transactional memory systems, and those data structures may include more, fewer, or different fields. For example, in one embodiment, an ownership record may include a field in which a transaction may store an indication that read accesses to the associated memory location(s) will always be implemented as invisible reads or an indication that they will never be implemented as invisible reads.

Figure 8:
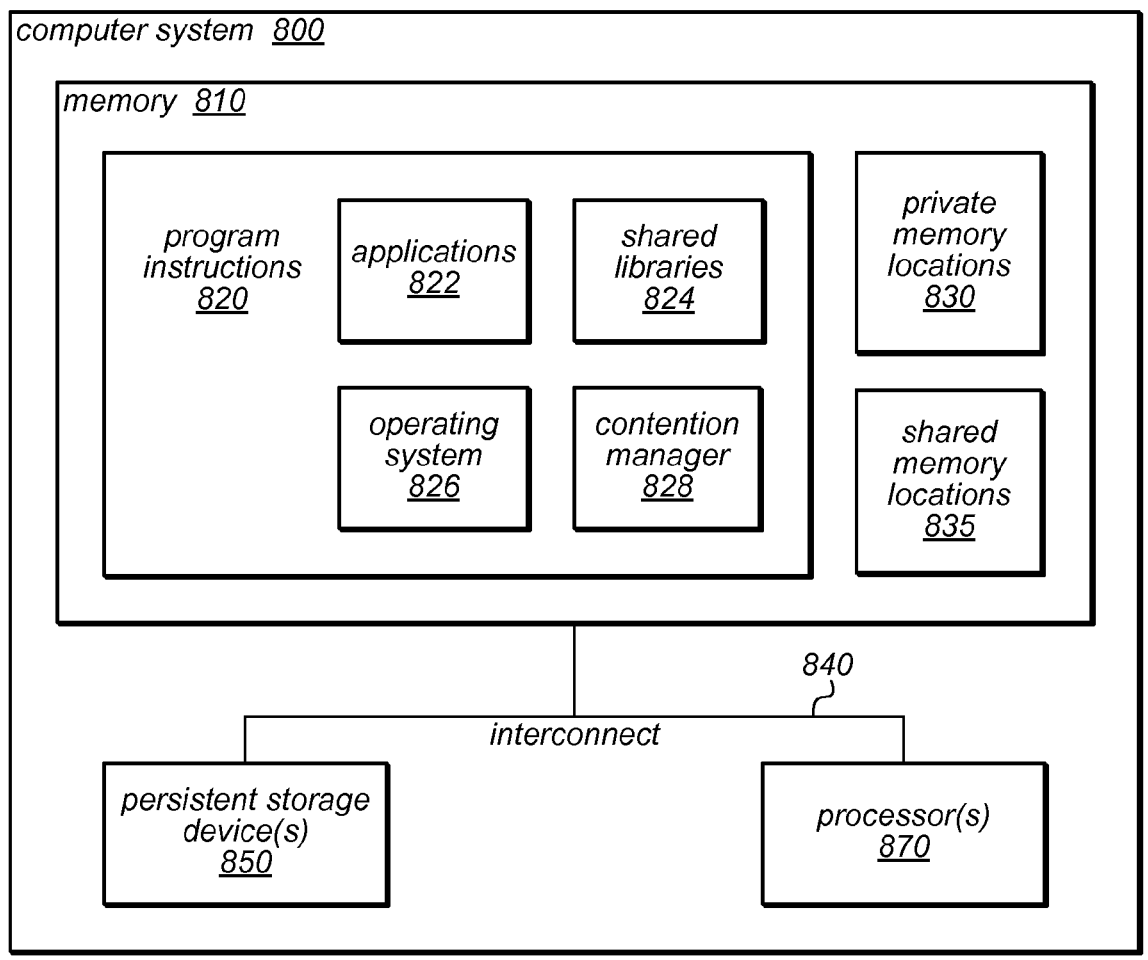
FIG. 8 is a block diagram illustrating a computer system configured to implement a transactional memory, according to various embodiments.

FIG. 8 illustrates a computing system configured to implement the methods described herein, according to various embodiments. The computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for providing transactional memory described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 800 may include one or more processors 870; each may include multiple cores, any of which may be single or multi-threaded. The computer system 800 may also include one or more persistent storage devices 850 (e.g. optical storage, magnetic storage, hard drive, tape drive, solid state memory, etc) and one or more memories 810 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.)

The one or more processors 870, the storage device(s) 850, and the system memory 810 may be coupled to the system interconnect 840. One or more of the system memories 810 may contain program instructions 820. Program instructions 820 may be executable to implement one or more applications 822, shared libraries 824, operating systems 826, or contention managers 828, as described herein. Program instructions 820 may be encoded in platform native binary, any interpreted language such as Java™ byte-code, or in any other language such as C/C++, Java™, etc or in any combination thereof. The program instructions 820 may include transactional memory support configured to provide functions, operations and/or other processes for implementing dynamic mixed mode validation of transactional read operations, as described herein. Such support and functions may exist in one or more of the shared libraries 824, operating systems 826, contention managers 828, or applications 822, in various embodiments. The system memory may further comprise private memory locations 830 and/or shared memory locations 835 where data may be stored. For example, these locations may store data in one or more ownership records, one or more read ownership arrays, one or more thread-local read-write conflict indicators, a global read-write conflict counter, one or more data structures configured to store metadata (e.g., snapshots) associated with read access operations (i.e. a read set or invisible reads subset thereof), and/or other data structures accessible to a plurality of concurrently executing threads, processes, or transactions, in various embodiments.

Although the embodiments above have been described in considerable detail, numerous variations and modifications will become apparent to those skilled in the art once the above disclosure is fully appreciated. For example, although many of the embodiments are described in terms of a hybrid transactional memory system, it should be noted that the techniques and mechanisms disclosed herein may be applicable in other contexts in which transactions are used, including software transactional memory and/or hardware transactional memory. It is intended that the following claims be interpreted to embrace all such variations and modifications.

What is claimed:

1. A method, comprising:
using a computer to perform:
executing program instructions comprising user code to be completed as an atomic transaction, wherein the user code comprises two or more memory access operations to a shared memory that is accessible to a plurality of concurrently executing transactions;
wherein for a given read memory access operation of the atomic transaction, said executing comprises:
recording a snapshot of a location in the shared memory targeted by the given read memory access operation or a snapshot of an ownership data structure associated with the targeted location in a data structure representing an invisible reads subset of a read set of the atomic transaction without attempting to acquire read ownership of the targeted location; and performing the given read memory access operation; and wherein for a subsequent read memory access of the atomic transaction targeting the targeted location, said executing comprises:

acquiring read ownership of the targeted location; and
performing the subsequent read memory access operation.

2. The method of claim 1, further comprising:
using the computer to perform validating the read set of the atomic transaction, wherein said validating comprises validating the subsequent read memory access of the atomic transaction using a semi-visible read validation technique, wherein validating memory accesses using a semi-visible read validation technique comprises determining whether there is a conflict between a writing transaction and one or more reading transactions in a manner that does not depend on determining which, if any, of the one or more reading transactions are in conflict with the writing transaction;

wherein for the given read memory access operation of the atomic transaction, said executing further comprises:
subsequent to said performing the given read memory access operation and prior to performing any other memory access operations, validating the invisible reads subset of the read set by iterating over the data structure representing the invisible reads subset to determine if current values of memory locations or ownership records thereof for which snapshots are included in the data structure representing the invisible reads subset match the snapshots.

3. The method of claim 2, further comprising:
using the computer to perform determining whether a cost of said iterating exceeds a target cost;
wherein said acquiring read ownership of the targeted location is performed in response to determining that the cost of said iterating exceeds the target cost.

4. The method of claim 1, wherein for a third read memory access of the atomic transaction targeting a second location in the shared memory, said executing comprises:
adding a snapshot of the second location or a snapshot of an ownership data structure associated with the second location in the data structure representing the invisible reads subset without attempting to acquire read ownership of the second location;
performing the third read memory access; and
validating the invisible reads subset of the read set by iterating over the data structure representing the invisible reads subset to determine if current values of memory locations or ownership records thereof for which snapshots are included in the data structure representing the invisible reads subset match the snapshots.

5. The method of claim 1, wherein for a third read memory access of the atomic transaction targeting a second location in the shared memory, said executing comprises:
acquiring read ownership of the second location; and
performing the third read memory access operation.

6. The method of claim 5, further comprising:
using the computer to perform:
determining that a cost of said acquiring read ownership of the second location exceeds a target cost;
storing an indication that the cost of said acquiring read ownership of the second location exceeds the target cost.

7. The method of claim 6, further comprising:
using the computer to perform:
executing program instructions comprising user code to be completed as a second atomic transaction, wherein the user code comprises two or more memory access operations to the shared memory;
wherein for a given read memory access operation of the second atomic transaction targeting the second location, said executing comprises:
detecting the indication that the cost of said acquiring read ownership of the second location exceeds the target cost; and
in response to said detecting:
adding a snapshot of the second location or a snapshot of an ownership data structure associated with the second location to a data structure representing an invisible reads subset of a read set of the second atomic transaction without attempting to acquire read ownership of the second location;
performing the given read memory access operation of the second atomic transaction; and
wherein for at least one other read memory access operation of the second atomic transaction targeting a location in the shared memory other than the second location, said executing comprises:
acquiring read ownership of locations targeted by the at least one other read memory access operations; and
performing the at least one other read memory access operations.

8. The method of claim 5, wherein said acquiring read ownership of the targeted location and said acquiring read ownership of the second location are performed as consecutive memory access operations subsequent to said performing the subsequent read memory access operation and said performing the third read memory access operation.

9. The method of claim 8, wherein said acquiring read ownership of the targeted location and said acquiring read ownership of the second location are performed within a single hardware transaction.

10. The method of claim 1, further comprising:
using the computer to perform dividing the user code into two or more code segments;
wherein said executing program instructions comprises executing at least one of the two or more segments within a hardware transaction.

11. A system comprising:
one or more processors; and
a memory coupled to the one or more processors and storing program instructions executable by the one or more processors to implement:
a thread executing program instructions comprising user code to be completed as an atomic transaction, wherein the user code comprises two or more memory access operations to a shared memory that is accessible to a plurality of concurrently executing transactions;
wherein for a given read memory access operation of the atomic transaction, said executing comprises:
recording a snapshot of a location in the shared memory targeted by the given read memory access operation or a snapshot of an ownership data structure associated with the targeted location in a data structure representing an invisible reads subset of a read set of the atomic transaction without attempting to acquire read ownership of the targeted location; and performing the given read memory access operation; and wherein for a subsequent read memory access of the atomic transaction targeting the targeted location, said executing comprises:

acquiring read ownership of the targeted location; and
performing the subsequent read memory access operation.

12. The system of claim 11,
wherein the program instructions are further executable by the one or more processors to implement validating the read set of the atomic transaction, wherein said validating comprises validating the subsequent read memory access of the atomic transaction using a semi-visible read validation technique, wherein validating memory accesses using a semi-visible read validation technique comprises determining whether there is a conflict between a writing transaction and one or more reading transactions in a manner that does not depend on determining which, if any, of the one or more reading transactions are in conflict with the writing transaction;

wherein for the given read memory access operation of the atomic transaction, said executing further comprises:

subsequent to said performing the given read memory access operation and prior to performing any other memory access operations, validating the invisible reads subset of the read set by iterating over the data structure representing the invisible reads subset to determine if current values of memory locations or ownership records thereof for which snapshots are included in the data structure representing the invisible reads subset match the snapshots; and wherein for a third read memory access of the atomic transaction targeting a second location in the shared memory, said executing comprises:

adding a snapshot of the second location or a snapshot of an ownership data structure associated with the second location to the data structure representing the invisible reads subset without attempting to acquire read ownership of the second location;

performing the third read memory access; and validating the invisible reads subset of the read set by iterating over the data structure representing the invisible reads subset to determine if current values of memory locations or ownership records thereof for which snapshots are included in the data structure representing the invisible reads subset match the snapshots.

13. The system of claim 11, wherein the program instructions are further executable by the one or more processors to implement:

determining that a cost of said acquiring read ownership of the targeted location exceeds a target cost;

storing an indication that the cost of said acquiring read ownership of the targeted location exceeds the target cost; and a second thread executing program instructions comprising user code to be completed as a second atomic transaction, wherein the user code comprises two or more memory access operations to the shared memory;

wherein for a given read memory access operation of the second atomic transaction targeting the targeted location, said executing comprises:

detecting the indication that the cost of said acquiring read ownership of the targeted location exceeds the target cost; and in response to said detecting:

adding a snapshot of the targeted location or a snapshot of an ownership data structure associated with the second location to a data structure representing an invisible reads subset of a read set of the second atomic transaction without attempting to acquire read ownership of the targeted location;

performing the given read memory access operation of the second atomic transaction; and wherein for at least one other read memory access operation of the second atomic transaction targeting a location in the shared memory other than the targeted location, said executing comprises:

acquiring read ownership of locations targeted by the at least one other read memory access operations; and performing the at least one other read memory access operations.

14. The system of claim 11,
wherein for a third read memory access of the atomic transaction targeting a second location in the shared memory, said executing comprises:

acquiring read ownership of the second location; and
performing the third read memory access operation; and wherein said acquiring read ownership of the targeted location and said acquiring read ownership of the second location are performed as consecutive memory access operations subsequent to said performing the subsequent read memory access operation and said performing the third read memory access operation.

15. The system of claim 11,
wherein the program instructions are further executable by the one or more processors to implement dividing the user code into two or more code segments; and wherein said executing program instructions comprises executing at least one of the two or more segments within a hardware transaction.

16. A non-transitory computer readable storage medium storing program instructions computer-executable to implement:

a thread executing program instructions comprising user code to be completed as an atomic transaction, wherein the user code comprises two or more memory access operations to a shared memory that is accessible to a plurality of concurrently executing transactions;

wherein for a given read memory access operation of the atomic transaction, said executing comprises:

recording a snapshot of a location in the shared memory targeted by the given read memory access operation or a snapshot of an ownership data structure associated with the targeted location in a data structure representing an invisible reads subset of a read set of the atomic transaction without attempting to acquire read ownership of the targeted location; and performing the given read memory access operation; and wherein for a subsequent read memory access of the atomic transaction targeting the targeted location, said executing comprises:

acquiring read ownership of the targeted location; and
performing the subsequent read memory access operation.

17. The storage medium of claim 16,
wherein the program instructions are further computer-executable to implement validating the read set of the atomic transaction, wherein said validating comprises validating the subsequent read memory access of the atomic transaction using a semi-visible read validation technique, wherein validating memory accesses using a semi-visible read validation technique comprises determining whether there is a conflict between a writing transaction and one or more reading transactions in a manner that does not depend on determining which, if any, of the one or more reading transactions are in conflict with the writing transaction;

wherein for the given read memory access operation of the atomic transaction, said executing further comprises:
subsequent to said performing the given read memory access operation and prior to performing any other memory access operations, validating the invisible reads subset of the read set by iterating over the data structure representing the invisible reads subset to determine if current values of memory locations or ownership records thereof for which snapshots are included in the data structure representing the invisible reads subset match the snapshots; and wherein for a third read memory access of the atomic transaction targeting a second location in the shared memory, said executing comprises:
adding a snapshot of the second location or a snapshot of an ownership data structure associated with the second location to the data structure representing the invisible reads subset without attempting to acquire read ownership of the second location;
performing the third read memory access; and
validating the invisible reads subset of the read set by iterating over the data structure representing the invisible reads subset to determine if current values of memory locations or ownership records thereof for which snapshots are included in the data structure representing the invisible reads subset match the snapshots.

18. The storage medium of claim 16, wherein the program instructions are further computer-executable to implement:
determining that a cost of said acquiring read ownership of the targeted location exceeds a target cost;
storing an indication that the cost of said acquiring read ownership of the targeted location exceeds the target cost; and
a second thread executing program instructions comprising user code to be completed as a second atomic transaction, wherein the user code comprises two or more memory access operations to the shared memory;
wherein for a given read memory access operation of the second atomic transaction targeting the targeted location, said executing comprises:
detecting the indication that the cost of said acquiring read ownership of the targeted location exceeds the target cost; and
in response to said detecting:
adding a snapshot of the targeted location or a snapshot of an ownership data structure associated with the second location to a data structure representing an invisible reads subset of a read set of the second atomic transaction without attempting to acquire read ownership of the targeted location;
performing the given read memory access operation of the second atomic transaction; and
wherein for at least one other read memory access operation of the second atomic transaction targeting a location in the shared memory other than the targeted location, said executing comprises:
acquiring read ownership of locations targeted by the at least one other read memory access operations; and
performing the at least one other read memory access operations.

19. The storage medium of claim 16,
wherein for a third read memory access of the atomic transaction targeting a second location in the shared memory, said executing comprises:
acquiring read ownership of the second location; and
performing the third read memory access operation; and
wherein said acquiring read ownership of the targeted location and said acquiring read ownership of the second location are performed as consecutive memory access operations subsequent to said performing the subsequent read memory access operation and said performing the third read memory access operation.

20. The storage medium of claim 16,
wherein the program instructions are further computer-executable to implement dividing the user code into two or more code segments; and
wherein said executing program instructions comprises executing at least one of the two or more segments within a hardware transaction.

* * * * *